(12) United States Patent
Hosoda

(10) Patent No.: US 12,045,525 B2
(45) Date of Patent: Jul. 23, 2024

(54) INFORMATION PROCESSING APPARATUS, INFORMATION PROCESSING METHOD, STORAGE MEDIUM, AND IMAGE FORMING APPARATUS

(71) Applicant: CANON KABUSHIKI KAISHA, Tokyo (JP)

(72) Inventor: Yasuhiro Hosoda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/328,008

(22) Filed: Jun. 2, 2023

(65) Prior Publication Data

US 2024/0012593 A1      Jan. 11, 2024

(30) Foreign Application Priority Data

Jul. 5, 2022   (JP) .................................. 2022-108525

(51) Int. Cl.
*G06F 3/12*   (2006.01)

(52) U.S. Cl.
CPC .......... *G06F 3/1238* (2013.01); *G06F 3/1222* (2013.01); *G06F 3/1288* (2013.01)

(58) Field of Classification Search
CPC ........ G06F 21/31; G06F 21/44; G06F 3/1238; G06F 3/1222; G06F 3/1288; G06F 21/45; G06F 21/32; G06F 21/36; G06F 3/016; G06F 18/00; G06F 3/04883; G06F 3/0481; G06F 21/40; G06F 21/6218; G06F 2221/2103; G06F 2221/2111; G06F 2221/2117; G06F 2221/2129; G06F 21/10; G06F 21/33; G06F 2221/2115; G06F 3/0488; G06F 8/31; G06F 9/451; G06F 21/305; G06F 21/6209; G06F 21/83; G06F 2221/2107; G06F 13/14; G06F 13/38; G06F 21/316; G06F 21/552; G06F 21/608;

(Continued)

(56) References Cited

U.S. PATENT DOCUMENTS 9,246,903 B2 *   1/2016   Adenuga .................. G06F 21/42
9,871,943 B1 *   1/2018   Hashizume ........ H04N 1/32192

(Continued)

FOREIGN PATENT DOCUMENTS

JP         2021060924 A     4/2021

*Primary Examiner* — Negussie Worku
(74) *Attorney, Agent, or Firm* — ROSSI, KIMMS & McDOWELL LLP

(57) ABSTRACT

An information processing apparatus that permits login of a user by transmitting authentication information on the user to a server that provides an authentication service and based on response results from the server performs output control by selecting a user interface based on a predetermined condition, which is one of a first user interface prepared in advance and a second user interface obtained by rendering by a browsing function, both for causing the user to input the authentication information. Here, the information processing apparatus transmits first authentication information input by using the first user interface to the server and receives first response results for the transmission from the server. Further, the information processing apparatus transmits second authentication information input by using the second user interface to the server and receives second response results for the transmission from the server.

7 Claims, 13 Drawing Sheets

(58) Field of Classification Search
CPC ........... G06F 2203/0384; G06F 3/0354; G06F 3/03545; G06F 3/044; G06F 3/0484; G06F 3/04842; G06F 3/04845; G06F 3/0487; G06F 3/1203; G06F 3/1267; G06F 3/127; G06F 15/00; G06F 15/16; G06F 16/273; G06F 16/275; G06F 16/338; G06F 16/951; G06F 16/9538; G06F 16/972; G06F 17/00; G06F 21/123; G06F 21/34; G06F 2209/482; G06F 2221/2149; G06F 9/4843; H04L 63/0807; H04L 63/0815; H04L 63/10; H04L 63/08; H04L 63/20; H04L 9/3231; H04L 69/329; H04L 2209/56; H04L 2209/80; H04L 63/0861; H04L 63/1441; H04L 9/3271; H04L 63/0853; H04L 63/205; H04L 2209/603; H04L 2463/101; H04L 63/062; H04L 63/0876; H04L 63/101; H04L 63/1483; H04L 41/22; H04L 63/102; H04L 63/105; H04L 63/1416; H04L 63/166; H04L 67/02; H04L 67/10; H04L 9/3247; H04L 12/2803; H04L 12/2809; H04L 12/2814; H04L 12/2818; H04L 12/40; H04L 2012/2841; H04L 2012/2845; H04L 2463/082; H04L 41/5054; H04L 61/00; H04L 61/25; H04L 61/35; H04L 61/5007; H04L 61/5038; H04L 61/5092; H04L 63/0823; H04L 63/083; H04L 63/123; H04L 63/168; H04L 67/34; H04L 67/51; H04L 67/53; H04L 67/75; H04L 9/32; H04L 9/3263; H04L 9/40; H04W 12/06; G06Q 20/40145; G06Q 20/341; G06Q 20/4014; G06Q 10/107; G06Q 20/322; G06Q 20/401; G06Q 30/06; G06Q 20/10; G06Q 20/227; G06Q 20/385; G06Q 20/306; G06Q 20/3278; G06Q 20/36; G06Q 20/367; G06Q 20/3821; G06Q 10/06; G06Q 20/102; G06Q 20/18; G06Q 20/20; G06Q 20/326; G06Q 20/3552; G06Q 20/386; G06Q 20/40; G06Q 20/4016; G06Q 20/403; G06Q 20/4037; G06Q 40/02; G06Q 50/22; G06Q 10/10; G06Q 20/04; G06Q 20/12; G06Q 20/202; G06Q 20/204; G06Q 20/24; G06Q 20/28; G06Q 20/32; G06Q 20/3223; G06Q 20/3224; G06Q 20/325; G06Q 20/3255; G06Q 20/327; G06Q 20/3274; G06Q 20/3276; G06Q 20/34; G06Q 20/342; G06Q 20/347; G06Q 20/349; G06Q 20/352; G06Q 20/354; G06Q 20/3674; G06Q 20/3678; G06Q 20/38215; G06Q 20/3825; G06Q 20/4012; G06Q 20/405; G06Q 20/42; G06Q 30/0185; G06Q 30/02; G06Q 30/0241; G06Q 30/04; G06Q 30/0601; G06Q 40/00; G06Q 50/18; G06V 40/166; G06V 40/67; G06V 10/17; G06V 10/24; G06V 10/242; G06V 10/98; G06V 40/12; G06V 40/16; G06V 40/161; G06V 40/172; G06V 40/18; G06V 40/50; G06V 40/70; G06V 10/10; G06T 2207/10016; G06T 7/70; G06T 11/00; G06T 1/005; G06T 2201/0051; G06T 2201/0065; G06T 2201/0083; H04N 23/611; H04N 23/62; H04N 23/63; H04N 23/632; H04N 23/64; H04N 21/4627; H04N 21/43615; H04N 21/4622; H04N 21/4782; H04N 23/00; H04N 5/765; H04N 5/77; H04N 5/775; H04B 1/40; G11B 19/02
USPC ....................................... 358/1.15
See application file for complete search history.

(56) References Cited

U.S. PATENT DOCUMENTS

| | | | | |
|---|---|---|---|---|
| 11,144,259 | B2* | 10/2021 | Mochizuki | H04N 1/4426 |
| 11,563,729 | B2 | 1/2023 | Hirosawa | |
| 2003/0065951 | A1* | 4/2003 | Igeta | H04L 63/08 |
| | | | | 726/4 |
| 2012/0154108 | A1* | 6/2012 | Sugaya | G08C 17/02 |
| | | | | 340/5.1 |
| 2014/0201081 | A1* | 7/2014 | Neuwirth | G06Q 20/40145 |
| | | | | 705/44 |
| 2015/0163672 | A1* | 6/2015 | Jin | H04W 12/068 |
| | | | | 726/3 |
| 2015/0317551 | A1* | 11/2015 | Mori | G06K 15/4095 |
| | | | | 358/1.14 |
| 2017/0244688 | A1* | 8/2017 | Kim | H04L 63/107 |
| 2019/0187945 | A1* | 6/2019 | Liu | G06F 3/1222 |
| 2020/0034095 | A1* | 1/2020 | Mukai | H04N 1/00408 |
| 2020/0104082 | A1* | 4/2020 | Watanabe | G06F 3/1238 |
| 2020/0213298 | A1* | 7/2020 | Ericson | H04W 12/47 |
| 2022/0100445 | A1* | 3/2022 | Tanimoto | G06F 3/1238 |
| 2022/0303269 | A1* | 9/2022 | Maruyama | G06F 21/45 |

* cited by examiner

Login Function Setting — Set | Cancel

Login method of local UI (401)
- ☑ Keyboard authentication
- ☐ IC card authentication

Setting of authentication destination (402)
- ☑ Local
- ☑ Server
  - ○ Authentication service 1 — Server setting of Authentication service 1
  - ○ Authentication service 2 — Server setting of Authentication service 2
  - ● Authentication service 3 — Server setting of Authentication service 3
  - ○ Authentication service 4 — Server setting of Authentication service 4
  (404)

Administration of local account (403)

Register | Edit | Delete

| | User Name | Role | Mail |
|---|---|---|---|
| ☐ | Admin | Administrator | admin@xxxxx.yyy |
| ☐ | Alice | Administrator | alice@xxxxx.yyy |
| ☐ | Bob | GeneralUser | bob@xxxxx.yyy |
| ☐ | Carol | GeneralUser | carol@xxxxx.yyy |
| ☐ | Dave | LimitedUser | dave@xxxxx.yyy |

FIG.4

Server Setting

Set | Cancel

Display name of authentication destination : [Authentication service 3]

Tenant name (Domain name) : [jjjjjj.kkkkkkkkkkk.lll]

Application ID (Client ID) : [nnnnnnnn-oooo-pppp-qqqq-rrrrrrrrrrrr]

Secret : [**********]

Use of web browser function in Keyboard authentication
- ○ Always
- ○ Only for multifactor authentication
- ● Not use

501

User name input complementation in Keyboard authentication

*You can omit input of @ and subsequent characters.
You cannot omit in a case you use web browser.

username @ [jjjjjj.kkkkkkkkkkk.lll] 502

User attribute storing ID of IC card

[employeeId] 503

FIG.5

INFORMATION PROCESSING APPARATUS, INFORMATION PROCESSING METHOD, STORAGE MEDIUM, AND IMAGE FORMING APPARATUS

BACKGROUND

Field

The present disclosure relates to a multifactor authentication technique of an information processing apparatus.

Description of the Related Art

As a service available via the internet, there is a cloud service (in the following, called "authentication service") that unitarily administers authentication information on accounts and the like of users belonging to a group, such as an enterprise or school, user information or the like, and provides a user authentication function. Japanese Patent Laid-Open No. 2021-060924 has disclosed an image forming apparatus that cooperates with an authentication service. Further, among authentication services, there is one that provides a user authentication function by multifactor authentication. For example, there is "Azure Active Directory (registered trademark)" of Microsoft Corporation, "Google Workspace (registered trademark)" of Google LLC, "Okta (registered trademark)" of Okta, Inc., or the like At present, the authentication service that provides the user authentication function by multifactor authentication premises that a client that operates as a front end is a web browser. Specifically, the authentication service supports only HTML (Hypertext Markup Language) based form authentication that premises that a client is a web browser. That is, with the unique UI (User Interface) in an embedded apparatus, it is not possible to perform user authentication by multifactor authentication, which is provided by the authentication service. In the following, the unique UI in an embedded apparatus is called an embedded UI. For a user familiarized with the use of an embedded apparatus, there is a case where the usability of the UI for user authentication (in the following, called "browser UI") that is provided via a web browser is not good compared to that of the embedded UI optimized for each embedded apparatus.

SUMMARY

The information processing apparatus according to the present disclosure is an information processing apparatus that permits login of a user by transmitting authentication information on the user to a server that provides an authentication service and based on response results from the server, and includes: one or more hardware processors; and one or more memories storing one or more programs configured to be executed by the one or more hardware processors, the one or more programs including instructions for: performing output control by selecting a user interface based on a predetermined condition, which is one of a first user interface prepared in advance and a second user interface obtained by rendering by a browsing function, both for causing the user to input the authentication information; transmitting first authentication information input by using the first user interface to the server; receiving first response results for the transmission of the first authentication information from the server; transmitting second authentication information input by using the second user interface to the server; and receiving second response results for the transmission of the second authentication information from the server.

Further features of the present disclosure will become apparent from the following description of exemplary embodiments with reference to the attached drawings.

BRIEF DESCRIPTION OF THE DRAWINGS

FIG. 4 is a diagram showing an example of a login function setting page;

FIG. 5 is a diagram showing an example of a server setting page;

DESCRIPTION OF THE EMBODIMENTS

Figure 1:
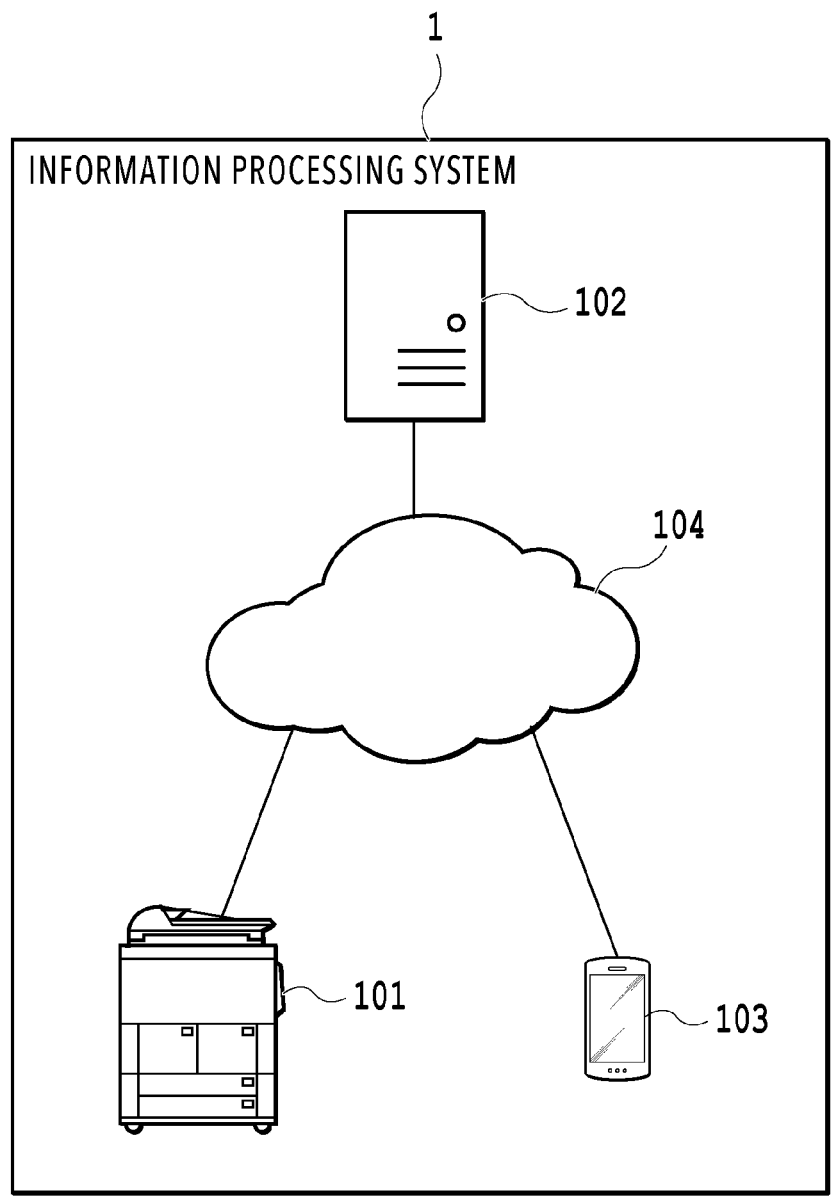
FIG. 1 is a diagram showing an example of a configuration of an information processing system.

Hereinafter, with reference to the attached drawings, the present disclosure is explained in detail in accordance with preferred embodiments. Configurations shown in the following embodiments are merely exemplary and the present disclosure is not limited to the configurations shown schematically.

Prior to explanations of a specific configuration, an example that uses an authentication service is explained supplementally. There are market needs for the desire to authenticate a user by using user authentication information administered in the cloud service and permit the use of an information processing apparatus only for the user having succeeded in the authentication. Specifically, for example, a user is caused to input user authentication information administered in the cloud service from an operation panel or the like arranged in the information processing apparatus and the user is authenticated by using the cloud service and only the user having succeeded in the authentication is enabled to log in to the information processing apparatus. As the protocol that the user authentication function of the cloud service supports, for example, there is "Resource Owner Password Credentials Grant" of "RFC6749 The OAuth 2.0 Authorization Framework". Further, the HTML (Hyper Text Markup Language) based form authentication that premises that a client is a web browser is also supported as the protocol of the user authentication function of the cloud service.

The user authentication function of the cloud service includes the multifactor authentication function using a plurality of factors. In a case where the authentication method of the second factor in multifactor authentication is predefined as the standard protocol, it is possible to prepare a unique user interface (UI) in accordance with the predefinition also in an embedded apparatus. However, in "RFC6749 The OAuth 2.0 Authorization Framework", the authentication method of the second factor in multifactor authentication is not predefined. Because of this, with the unique UI (in the following, called "embedded UI") prepared in advance in the embedded apparatus, it is not possible to utilize multifactor authentication provided as the user authentication function of the cloud service. In the present situation, in order to utilize the multifactor authentication function in the user authentication function of the cloud service, it is necessary to use the HTML based form authentication that premise that a client is a web browser.

Further, in a case where the embedded UI is compared to the user authentication UI (in the following, called "browser UI") provided via a web browser, the usability of the browser UI is lower sometimes. For example, the account of a user (in the following, simply called "account") administered in the cloud service has a format, such as aaa@bbb.ccc.ddd (aaa, bbb, ccc, and ddd are each an arbitrary character string determined in advance), and the number of characters is very large. Here, an arbitrary character string before @, which corresponds to aaa, is allocated to each user for identifying the user and the character string after @ is for identifying the department or group to which the user belongs, or the enterprise, group or the like that provides the cloud service. In a case of the embedded UI, it is possible to cause a user to input only the character string before @, which corresponds to the user name, and omit the input of the character string after @. However, in a case of the browser UI, it is necessary to input the entire character string corresponding to the account.

Embodiment 1

With reference to FIG. 1 to FIG. 13, an information processing apparatus according to Embodiment 1 is explained. In Embodiment 1, as an example, explanation is given on the assumption that the information processing apparatus according to the present disclosure is an MFP (Multifunction Peripheral) having a plurality of functions, such as the copy function, the print function, and the scan function. The information processing apparatus according to the present disclosure is not limited to the MFP and may be an image forming apparatus, such as a printer or copy machine, an image input device, such as an image scanner, a recording device for monitoring, a medical device or the like as long as the information processing apparatus is an embedded apparatus.

System Configuration

With reference to FIG. 1, the configuration of an information processing system 1 according to Embodiment 1 is explained. The information processing system 1 comprises an MFP 101, a server 102, and a user terminal 103. The MFP 101 is an information processing apparatus according to the present disclosure and is an embedded apparatus having a plurality of functions, such as the copy function, the print function, and the scan function. The server 102 is a cloud server arranged on a cloud and provides a user authentication function as a cloud service. In the following, explanation is given by referring to the user authentication function provided by the server 102 as the cloud user authentication service. The MFP 101 is capable of communicating with the server 102 via an internet 104. The server 102 provides the cloud user authentication service to the MFP 101. The user terminal 103 is a smartphone or a tablet terminal of a user using the MFP 101 (in the following, simply described as "user"), a personal computer (PC) or the like used by a user. It is also possible for the user terminal 103 to communicate with the server 102 via the internet 104. It is supposed that the information processing system 1 has, although not shown schematically in FIG. 1, a plurality of MFPs having the same configuration as that of the MFP 101 and further has a user terminal that a user using the MFP, not shown schematically in FIG. 1, has or uses. That is, the server 102 provides the cloud user authentication service to the MFP 101 and a plurality of MFPs including MFPs, not shown schematically in FIG. 1.

Hardware Configuration of MFP

Figure 2:
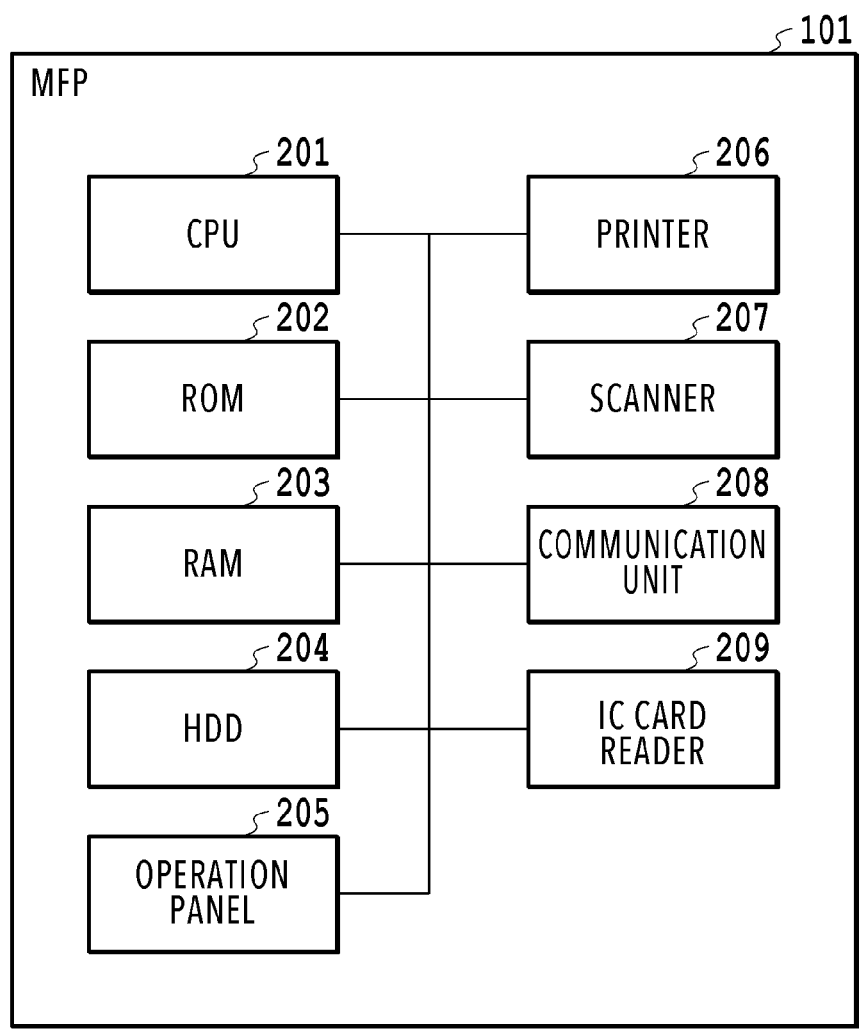
FIG. 2 is a block diagram showing an example of a hardware configuration of an MFP.

With reference to FIG. 2, the hardware configuration of the MFP 101 is explained. FIG. 2 is a block diagram showing an example of the hardware configuration of the MFP 101 according to Embodiment 1. A CPU (Central Processing Unit) 201 is a processor that controls the operation of the MFP 101. A RAM (Random Access Memory) 203 is a volatile memory. The RAM 203 is used as a work area of the CPU 201 in a case of calculation. Specifically, the RAM 203 is used as a temporary storage area for rasterizing various programs, data and the like stored in a ROM (Read Only memory) 202, an HDD (Hard Disk Drive) 204 or the like. The ROM 202 is a nonvolatile memory and stores programs that do not need to be changed, such as boot programs of the MFP 101, and data. The HDD 204 is a nonvolatile storage medium whose capacity is large compared to that of the RAM 203. In the HDD 204, controls programs of the MFP 101, OS (Operating System) programs, application programs, various kinds of data and the like are stored.

The CPU 201 reads and executes a boot program stored in the ROM 202 in a case of activation of the MFP 101. This boot program is for reading the OS program stored in the HDD 204 and rasterizing the OS program onto the RAM 203. In a case where the CPU 201 executes the boot program, following this, the OS program is rasterized onto the RAM 203 and further, the control program is rasterized onto the RAM 203. The CPU 201 performs control of the MFP 101 by executing the rasterized OS program and control program. Further, the CPU 201 also performs reading and writing of data that is used for control program processing, such as reading the data from the ROM 202, the HDD 204 or the like and causing the RAM 203 to store the data. In the present embodiment, explanation is given on the assumption that in the MFP 101, the one CPU 201 performs each piece of processing shown in a flowchart, to be described later, but another aspect may be accepted. For example, it may also be possible to configure the MFP 101 so that processors, such as a plurality of CPUs or MPUs (microprocessor units), perform each piece of processing shown in a flowchart, to be described later, in cooperation with one another. Further, it may also be possible to configure the MFP 101 so that part of processing, to be described later, is performed by using a hardware circuit, such as an ASIC (Application Specific Integrated Circuit) or an FPGA (Field-Programmable Gate Array).

An operation panel 205 is a display with which it is possible to perform the input operation by a touch operation of a touch panel and the like. It is possible for a user to give instructions to perform each function of the MFP 101 by performing the input operation while referring to the UI displayed on the display of the operation panel 205. A printer 206 is a printer engine that forms an image represented by print data received from the outside via a communication unit 208, or an image represented by digital data obtained from a scanner 207 on a printing medium. The scanner 207 is a scanner device that generates digital data by reading an image formed on a printing medium and outputs the generated digital data. The communication unit 208 is a network interface for connecting to the interne 104 or a LAN (Local Area Network) constructed in an office or the like. An IC card reader 209 is a device for reading information (in the following, called "IC card information") used for user authentication from an IC card of a user and used for implementing IC card authentication.

Function Configuration of Server

Figure 3:
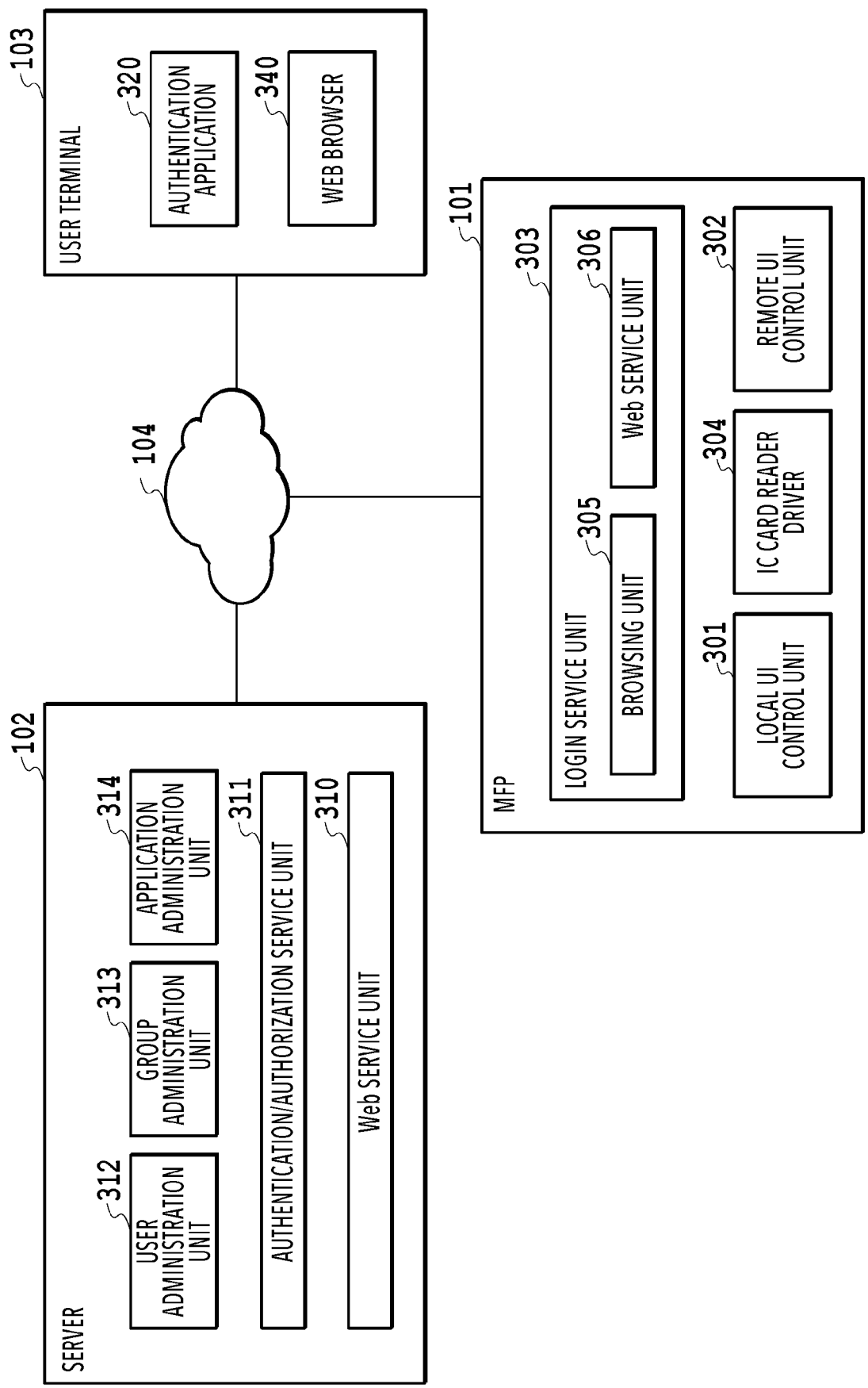
FIG. 3 is a block diagram showing an example of a function configuration of the MFP, a server, and a user terminal.

FIG. 3 is a block diagram showing an example of the function configuration of the MFP 101, the server 102, and the user terminal 103 according to Embodiment 1. With reference to FIG. 3, first, the function configuration of the server 102 is explained. The server 102 administers accounts corresponding to each of a plurality of users belonging to parties (in the following, called "tenants"), such as companies and schools, with which service providers contract, such as companies or parties providing cloud services. Specifically, the server 102 unitarily administers user authentication information, user information and the like as accounts. Further, the server 102 provides cloud services including a cloud user authentication service. The cloud service provided by the server 102 is "Azure Active Directory (registered trademark) of Microsoft Corporation, "Google Workspace (registered trademark)" of Google LLC, "Okta (registered trademark)" of Okta, Inc., or the like. The server 102 administers tenants by identifying them by the tenant ID (identification) or the tenant name. The tenant name is sometimes called domain name or directory name. For example, in "Azure Active Director (registered trademark)", for administration of tenants, Tenant ID and Tenant name (Domain name) as shown as an example in Table 1 below are used. Here, eeeeeeee, ffff, gggg, hhhh, iiiiiiiiiii, jjjjjj, kkkkkkkkkkk, and lll are arbitrary character strings determined in advance.

TABLE 1

| Item | Value |
| --- | --- |
| Tenant ID | eeeeeeee-ffff-gggg-hhhh-iiiiiiiiiii |
| Tenant name (Domain name) | jjjjjj.kkkkkkkkkkk.lll |

The server 102 comprises a Web service unit 310 for communicating with a client, such as the MFP 10, by using HTTP (Hypertext Transfer Protocol). The Web service unit 310 supports, as the authentication protocol, for example, "OAuth 2.0", "OpenID Connect", "WS-Federation", "SAML 2.0", and "REST API". For example, as "REST API" provided by "Azure (registered trademark)" of Microsoft Corporation, there is one called "Graph API". The Web service unit 310 provides a web page configured by HTML or the like to a user who accesses the server 102 by using a web browser 340 that runs on the user terminal 103. For example, an administrator of tenants (in the following, simply called "administrator") registers and administers accounts of users belonging to the tenants the administrator administers by using a web page provided by the Web service unit 310. A user administration unit 312 stores and administers information on accounts corresponding to each of a plurality of users registered by using the web page. For example, in "Azure Active Directory (registered trademark)", as information associated with one account, it is possible to administer information shown in Table 2 below.

TABLE 2

| Item | Attribute Name |
| --- | --- |
| User name | userPrincipalName |
| Password | |
| Name | DisplayName |
| Given name | GivenName |
| Surname | surName |
| User type | userType |
| Job title | jobTitle |
| Department | department |
| Employee ID | employeeId |
| Usage location | UsageLocation |
| Street address | StreetAddress |
| State | State |
| Country/region | Country |
| Office | PhysicalDeliveryOfficeName |
| City | City |
| Postal code | PostalCode |
| Office telephone number | telephoneNumber |
| Mobile phone | mobilePhone |
| State of multifactor authentication | |

User name is an identifier for uniquely specifying a user. For example, in a case of "Azure Active Directory (registered trademark)", a character string, such as "aaa@bbb.ccc.ddd", which is obtained by combining the character string indicating the name of a user and the character string indicating the tenant name by @, is used as User name. It is possible for a user to access the web page provided by the Web service unit 310, use "REST API", and so on after user authentication using User name and Password registered by an administrator in the user administration unit 312. Further, it is possible for a user having succeeded in user authentication to access the web browser provided by the Web service unit 310 and set or change multifactor authentication. For example, it is possible for a user to select one of a plurality of methods as an authentication method used for the second factor in a multifactor authentication method in the setting of multifactor authentication. As the authentication method of the second factor, there is SMS (short message service), application for authentication (in the following, called "authentication application"), authentication token or the like.

In authentication using SMS, first, the server 102 transmits a one-time password using SMS to the user terminal 103 capable of utilizing SMS, such as a smartphone. The user terminal 103 receives the one-time password and displays the received one-time password on a display unit arranged in the user terminal 103. The user checks the one-time password displayed on the display unit of the user terminal 103 and inputs the one-time password to the browser UI of the MFP 101. MFP 101 transmits the one-time password input to the browser UI to the server 102 and requests the server 102 for user authentication of the second factor.

In the authentication using an authentication application, first, the server 102 transmits a one-time password to the user terminal 103. An authentication application 320 that runs on the user terminal 103 displays the received one-time password on the display unit of the user terminal 103 by using a Push notification function of a mobile application. A user checks the one-time password displayed on the display unit of the user terminal 103 and inputs the one-time password to the browser UI of the MFP 101. The MFP 101 transmits the one-time password input to the browser UI to the server 102 and request the server 102 for user authentication of the second factor.

The authentication using the authentication application is not limited to the above-described aspect. For example, the following authentication may be accepted. The server 102 transmits an approval request to the user terminal 103. The authentication application 320 that runs on the user terminal 103 displays a UI for responding to the received approval request on the display unit of the user terminal 103 by using the Push notification function of the mobile application. The user performs the input operation indicating whether or not to approve by using this UI. The authentication application 320 responds to the approval request by transmitting information indicating whether or not to approve corresponding to the input operation to the server 102.

In the authentication using an authentication token, the user terminal 103 transmits TOTP (Time-based One-time Password) calculated by the authentication application 320 that runs on the user terminal 103 to the server 102. TOTP is a generation method of a one-time password predefined in RFC 6238. In this generation method, the user terminal 103 generates a one-time password by using time information and Secret of TOTP, which is generated for each user. Secret of TOTP is a value by a random number. In a case where a user first enables multifactor authentication for the first time, for example, the user first captures image data of a QR code (registered trademark) into the user terminal 103. Specifically, for example, the user captures the image data of the QR code into the user terminal 103 by a method of capturing a QR code inserted into a web page by an imaging device arranged in the user terminal 103, a method of capturing a screen, or the like.

The authentication application 320 obtains Secret indicated by the QR code based on the image data and after obtaining Secret, calculates a one-time password that changes over time. The authentication application 320 displays the calculated one-time password on the display unit of the user terminal 103. The user checks the one-time password displayed on the display unit of the user terminal 103 and inputs the one-time password to the browser UI of the MFP 101. The MFP 101 transmits the one-time password input to the browser UI to the server 102 and requests the server 102 for user authentication of the second factor. As the example of the authentication application 320, there is "Google Authenticator (registered trademark)" of Google LLC, "Microsoft Authenticator (registered trademark)" of Microsoft Corporation, or the like.

The Web service unit 310 performs user authentication of the second factor by using, for example, one of the above-described authentication methods, in addition to the user authentication using User name and Password for the user having enabled multifactor authentication. It is possible for an administrator to perform the setting to force a user having registered in the user administration unit 312 to utilize multifactor authentication. In a case where the setting to force a certain user to utilize multifactor authentication is made and the user accesses the web page in the state where the user has not enabled multifactor authentication, for example, the Web service unit 310 inserts information for prompting the user to enable multifactor authentication into the web page.

It is possible for the administrator to create and administer a user group by using the web page that is provided from the Web service unit 310. A group administration unit 313 administers information on the user group created by the administrator. Further, it is possible for the administrator to register and administer information on the application by using the web page that is provided from the Web service unit 310. The application that is referred to here is a client capable of accessing the server 102. The client is, for example, a cloud service that is provided by a cloud server different from the server 102, an application installed in the user terminal 103, a service or application that runs on the MFP 101, or the like. An application administration unit 314 administers information on an application registered by the administrator. Here, mmmmmm, nnnnnnnn, oooo, pppp, qqqq, rrrrrrrrrrr, and ********** are arbitrary character strings determined in advance.

TABLE 3

| Item | Value |
| --- | --- |
| Application name | mmmmmm |
| Application ID (Client ID) | nnnnnnnn-oooo-pppp-qqqq-rrrrrrrrrrr |
| Secret | ********** |
| REST APT access permission | User.ReadAll |
| | User.ReadWriteAll |
| | Group.ReadAll |

Application ID is also called Client ID and is an identifier for uniquely specifying an application (client). Secret is a password used for authenticating a proper application (client). In the present embodiment, Application ID and Client ID are together called Application ID. Application ID is used, for example, as "client_id" described in "2.3.1 Client Password" of "RFC6749 The OAuth 2.0 Authorization Framework". Further, similarly, Secret is used, for example, as "client_secret". As the access right of an application, it is possible to register "REST API" available by an application having succeeded in authentication as a client. For example, "User.ReadAll" means that information on all users can be read and "User.ReadWriteAll" means that information on all users can be read and written. Further, "Group.ReadAll" means that information on all user groups can be read.

An authentication/authorization service unit 311 refers to information administered by each of the user administration unit 312, the group administration unit 313, and the application administration unit 314 and authenticates a user or client (application) accessing the Web service unit 310. Further, the authentication/authorization service unit 311 gives permission to access "REST API" to a client (application) having succeeded in authentication.

Function Configuration of MFP

With reference to FIG. 3, the function configuration of the MFP 101 is explained. A local UI control unit 301 provides a local UI that is displayed on the display of the operation panel 205. The local UI is a login screen, a menu screen, a setting screen and the like. For example, on the menu screen, buttons for enabling a user to select the function that is provided by the MFP 101, such as the copy function and the scan function, buttons for displaying a setting screen on which to perform the setting of the MFP 101, or the like are displayed. The login screen will be described later. The local UI control unit 301 performs control of screen transition of the local UI.

For example, in a case where a user presses down a button corresponding to the copy function on the menu screen, the MFP 101 provides the copy function to the user by controlling the printer 206 and the scanner 207. At this time, the local UI control unit 301 provides the local UI for checking the setting of the copy function or the state of the copy function. Further, in a case where a user presses down a button corresponding to the scan function, the MFP 101 provides the scan function to transmit digital data to a predetermined device, which is obtained by reading an image formed on a printing medium, by controlling the scanner 207 and the communication unit 208. At this time, the local UI control unit 301 provides the local US for checking the setting of the scan function or the state of the scan function. In the present embodiment, it is assumed that the processing for performing each function provided by the MFP 101 is performed by the local UI control unit 301.

A remote UI control unit 302 has the HTTP server function and outputs information indicating a web page configured by HTML to the user terminal 103 and provides a web page to a user who accesses remotely. Specifically, the user access the remote UI control unit 302 by utilizing a web browser that runs on the user terminal 103 and causes the user terminal 103 to obtain information indicating the web page. The web browser that runs on the user terminal 103 performs rendering of the obtained information indicating the web page and displays the web page as the remote UI. It is possible for a user to change the setting of the MFP 101, utilize the function that is provided by the MFP 101, and so on, by using the remote UI.

A login service unit 303 performs user authentication in a case where a user utilizes the function that is provided by the MFP 101 or an application. An IC card reader driver 304 is a driver that controls the IC card reader 209 and provides IC card information to the login service unit 303 by obtaining the IC card information from the IC card. The login service unit 303 contains a browsing unit 305 that provides the web browser function. The browsing unit 305 obtains information indicating a web page configured by HTML like the web browser 340 and performs rendering of the obtained information indicating the web page and draws the web page on the display of the operation panel 205 as a login screen. The browsing unit 305 obtains the information indicating the web page from the Web service unit 310 of the server 102. The browsing unit 305 includes an HTML rendering engine, such as WebKIT, and the web browser function is provided by this HTML rendering engine. In the following, explanation is given by referring to the function of the HTML rendering engine that runs on the MFP 101 to draw a web page on the display of the operation panel 205 as WebView.

Processing of Login Service Unit 303

With reference to FIG. 4 to FIG. 7, the setting of the login function that is provided by the login service unit 303 and the processing of the login service unit 303 are explained. FIG. 4 is a diagram showing an example of a UI (in the following, called "Login Function Setting page 400") for setting the login function that is provided by the login service unit 303 according to Embodiment 1. The Login Function Setting page 400 is a web page that is provided by the remote UI control unit 302 and is a web page that is obtained by the web browser 340 that runs on the user terminal 103 performing rendering of the information indicating the Login Function Setting page 400. It is possible for an administrator to perform the setting of a login method of a user, and the setting of registration, editing, deletion and the like of the account (in the following, called "local account") that is administered only in the MFP 101 using the Login Function Setting page 400. The value (in the following, also called "set value") that is set on the Login Function Setting page 400 is stored in the HDD 204. The login service unit 303 reads the set value relating to the login function from the HDD 204. The behavior of the login service unit 303 is determined based on the read set value.

A setting item 401 is an item relating to the setting of a login method on a local UI. It is possible to set whether or not to enable "Keyboard authentication" and "IC card authentication", respectively. Keyboard authentication is an authentication method for performing user authentication by causing a user to input a user name and password and using them. IC card authentication is an authentication method for performing user authentication by using an IC card a user has.

Figure 6A:
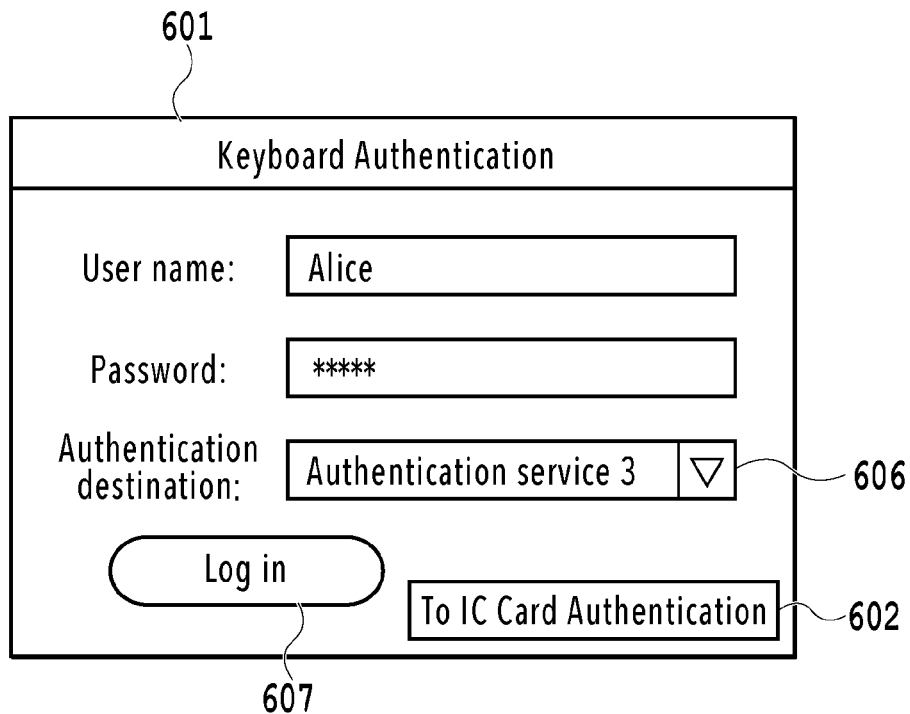
FIG. 6A and FIG. 6B are each a diagram showing an example of a keyboard authentication screen and an example of an IC card authentication screen.

FIG. 6A is a diagram showing an example of a Keyboard Authentication screen 601 according to Embodiment 1. In a case where the setting to enable Keyboard authentication is made in the setting item 401, for example, the login service unit 303 obtains information indicating a UI (for example, Keyboard Authentication screen 601) for Keyboard authentication from the local UI control unit 301 at the time of user authentication. Further, the login service unit 303 displays the Keyboard Authentication screen 601 shown as an example in FIG. 6A on the display of the operation panel 205. The Keyboard Authentication screen 601 is one of login screens for enabling a user to log in to the MFP 101 and is a unique embedded UI prepared in advance in the MFP 101.

Figure 6B:
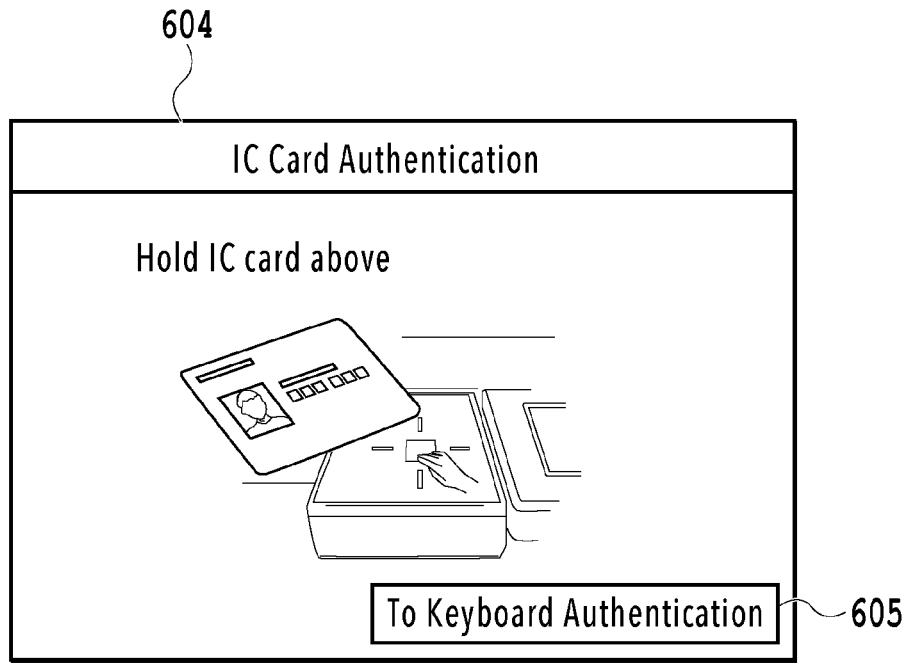

FIG. 6B is a diagram showing an example of an IC Card Authentication screen 604 according to Embodiment 1. In a case where the setting to enable IC card authentication is made in the setting item 401, for example, the login service unit 303 obtains information indicating a UI (for example, IC Card Authentication screen 604) for IC card authentication from the local UI control unit 301 at the time of user authentication. Further, the login service unit 303 displays the IC Card Authentication screen 604 shown as an example in FIG. 6B on the display of the operation panel 205. The IC Card Authentication screen 604 is one of login screens for enabling a user to log in to the MFP 101 and is a unique embedded UI prepared in advance in the MFP 101. In a case where the setting to enable both "keyboard authentication" and "IC card authentication" is made in the setting item 401, for example, on the Keyboard Authentication screen 601, a button 602 for making a transition into the IC Card Authentication screen 604 is displayed. Further, in this case, for example, on the IC Card Authentication screen 604, a button 605 for making a transition into the Keyboard Authentication screen 601 is displayed. Due to this, it is possible for a user to select a desired login method by switching between the Keyboard Authentication screen 601 and the IC Card Authentication screen 604.

A setting item 402 is an item relating to the setting of authentication destinations. In the setting item 402, it is possible for an administrator to set "Local" and "Server", respectively, to be enabled or not as an authentication destination. A setting item 403 is an item relating to the setting of local accounts. In the setting item 403, it is possible for an administrator to perform the setting relating to local accounts. The set values in the setting item 402 and the setting item 403 are stored in the HDD 204. For example, the local accounts are stored in the HDD 204 and administered as a user account table as shown as an example in Table 4 below. As the items of the user account table, there are User Name, Password, Card ID, Role, Mail address and the like as shown as an example in Table 4. Here, sssssss, ttttttt, uuuuuuu, vvvvvvv, wwwwwww, xxxxx, and yyy are arbitrary character strings determined in advance.

TABLE 4

| User Name | Password | Card ID | Role | Mail |
|---|---|---|---|---|
| Admin | ******** | ssssssss | Administrator | admin@xxxxx.yyy |
| Alice | ******** | ttttttt | Administrator | alice@xxxxx.yyy |
| Bob | ******** | uuuuuuuu | GeneralUser | bob@xxxxx.yyy |
| Carol | ******** | vvvvvvvv | GeneralUser | carol@xxxxx.yyy |
| Dave | ******** | wwwwwwww | LimitedUser | dave@xxxxx.yyy |

In a case where the setting to enable "Local" is made in the setting item 402, user authentication is performed by using the set value of the setting item 403. Specifically, for example, the login service unit 303 performs user authentication by comparing the information indicating the user name and password input to the Keyboard Authentication screen 601 and the values of the user name and password set in the setting item 403. "Card ID" is information on the character string corresponding to information stored in an IC chip arranged in an IC card that is used at the time of IC card authentication. For example, the login service unit 303 performs user authentication by comparing the IC card information obtained while displaying the IC Card Authentication screen 604 and the value of Card ID that is set in the setting item 403.

"Role" is information indicating the right of use for a user about the function that is provided by the MFP 101, an application and the like. The correspondence between the value that is set in Role and the right of use of the function, an application and the like is administered in a role information table as shown as an example in Table 5 below. It may also be possible to enable an administrator to arbitrarily add the set value of Role, in addition to the initial value that is set at the time of the MFP 101 being shipped from factory. Further, it may also be possible to enable an administrator to change the right of use corresponding to the set value of Role to a desired right.

TABLE 5

| Role | Right |
|---|---|
| Administrator | setting change possible, color printing possible, address book editing possible |
| GeneralUser | setting change not possible, color printing possible, address book reference possible |
| LimitedUser | setting change not possible, color printing prohibited, address book reference prohibited |

In a case where the setting to enable "Server" is made in the setting item 402, an administrator selects one cloud user authentication service that is used for authentication from among a plurality of alternatives. Further, the administrator performs the setting of the cloud user authentication service by pressing down a button 404 for performing the setting of the selected cloud user authentication service. Here, as the examples of the cloud user authentication services taken as alternatives, there is "Azure Active Directory (registered trademark), "Google Workspace (registered trademark)", "Okta (registered trademark)" or the like described above.

FIG. 5 is a diagram showing an example of a Server Setting page 500 according to Embodiment 1. For example, in a case where the button 404 of "Server setting of Authentication service 3" is pressed down, as a response to that, the remote UI control unit 302 transmits information to the user terminal 103, which indicates the Server Setting page 500 of Authentication service 3 shown as an example in FIG. 5. The web browser 340 that runs on the user terminal 103 displays the Server Setting page 500 by performing rendering of this information. The Server Setting page 500 of Authentication service 3 is a web page for setting information necessary for cooperating with Authentication service 3, which is a cloud user authentication service. "Display name of authentication destination" is information for identifying the cloud user authentication service that is used by a user for authentication. The set character string is displayed in an area 606 corresponding to "Authentication destination" on the Keyboard Authentication screen 601. For Tenant name, the same value as the value shown in Table 1 is set. For "Application ID" and "Secret", the same values as the information shown in Table 3 are set.

Figure 7:
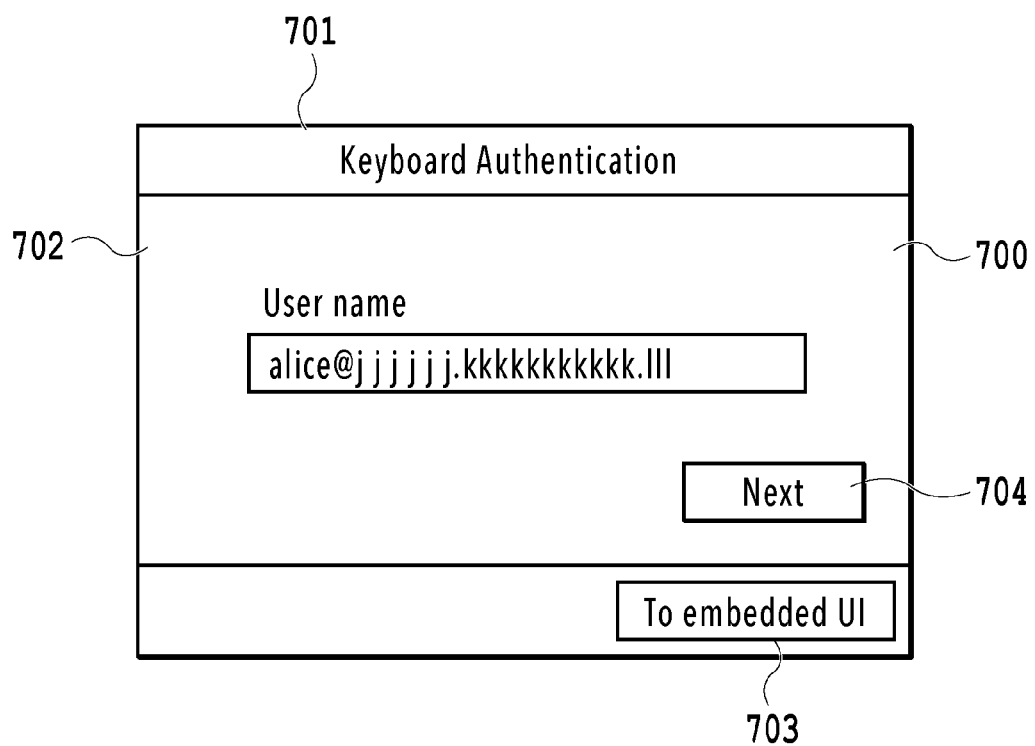
FIG. 7 is a diagram showing an example of the keyboard authentication screen.

A setting item 501 is an item for setting whether or not to use the web browser function that is provided by the browsing unit 305 as a UI in a case where user authentication is performed by using a user name and password. A user selects one of "Always", "Only for multifactor authentication", and "Not use". FIG. 7 is a diagram showing an example of a Keyboard Authentication screen 701 according to Embodiment 1. The Keyboard Authentication screen 701 is one of login screens for enabling a user to log in to the MFP 101 and is a browser UI that is provided by the browsing unit 305 of the MFP 101 via the browser function. An area 700 on the Keyboard Authentication screen 701 is an area in which a user authentication page 702 is drawn, which is obtained by performing rendering by WebView for information indicating a user authentication page configured by HTML, which is obtained from the Web service unit 310 of the server 102.

In a case where "Always" is selected in the setting item 501, the login service unit 303 obtains information indicating a user authentication page for Keyboard authentication from the Web service unit 310 of the server 102 at the time of user authentication. The browsing unit 305 performs rendering of the information obtained by the login service unit 303. The browsing unit 305 draws the user authentication page 702 obtained by the rendering in the area 700.

The Keyboard Authentication screen 701 is a screen for authenticating login to the MFP 101, and therefore, is configured so that it is not possible for a user to input an arbitrary URL (Uniform Resource Locator). Due to this, it is possible to prevent a user from making a transition into an unintended screen by designating an arbitrary URL. In a case where the setting to enable both "Local" and "Server" is made in the setting item 402, as shown as an example in FIG. 7, it may also be possible for the Keyboard Authentication screen 701 to include a button 703. The button 703 is a button for switching the Keyboard Authentication screen 701 to the Keyboard Authentication screen 601 and it is possible for user to switch the above-described screens by pressing down the button 703.

In a case where "Not use" is selected in the setting item 501, for example, the login service unit 303 obtains information indicating an embedded UI (for example, Keyboard Authentication screen 601) from the local UI control unit 301 at the time of user authentication. Further, the login service unit 303 displays the Keyboard Authentication screen 601 shown as an example in FIG. 6A, or the IC Card Authentication screen 604 shown as an example in FIG. 6B on the display of the operation panel 205. The case where "Only for multifactor authentication" is selected in the setting item 501 will be described later.

A setting item 502 is an item relating to the setting for complementing information indicating a user name input to the Keyboard Authentication screen 601. In a case where @ is not included in the information indicating the user name input to the Keyboard Authentication screen 601, the login service unit 303 determines that the input of @ and subsequent characters is omitted. In this case, the login service unit 303 uses information indicating the coupled character string for user authentication by taking the character string obtained by coupling the user name input to the Keyboard Authentication screen 601 and the character string set in the setting item 502 by @ as the user name. Specifically, for example, in a case where information indicating the user name input to the Keyboard Authentication screen 601 is "alice@jjjjjj.kkkkkkkkkkk.lll", the login service unit 303 uses the information indicating the input character string for authentication as it is. In a case where information indicating the user name input to the Keyboard Authentication screen 601 is "alice", the login service unit 303 determines that the input of @ and subsequent characters is omitted. Specifically, the login service unit 303 complements "@jjjjjj.kkkkkkkkkkk.lll" after "alice". Further, the login service unit 303 uses the information indicating the complemented "alice@jjjjjj.kkkkkkkkkkk.lll" for user authentication.

A setting item 503 is an item that is used in a case where a card ID of an IC card is set as the user attribute of the cloud user authentication service. For example, in "Azure Active Directory (registered trademark)", there are user attributes shown as an example in Table 2. In a case where authentication is performed by obtaining information indicating Employee ID from an IC card, in the setting item 503, for example "employeeId" is set. Further, Employee ID shown in Table 2 is originally the area in which "employeeId" is set as the attribute value, but it may also be possible to use Employee ID as an area in which a card ID, such as the manufacturer's serial number of the IC card, is stored.

Operation of MFP

The operation of the MFP 101 is explained. In the present embodiment, explanation is given on the assumption that the procedure of a processing flow, to be described later, is recorded in the control program. The control program is stored in a nonvolatile storage medium, such as the ROM 202 or the HDD 204, and rasterized onto the RAM 203 and each piece of processing is performed by the CPU 201 in accordance with the processing flow. The processing of each unit shown in FIG. 3, which the MFP 101 has as the function configuration, is implemented by the CPU 201 executing the control program, but it is not necessary for the CPU 201 to perform all pieces of processing. For example, as described above, it may also be possible for the MFP 101 to comprise a dedicated hardware circuit configured to perform one or more pieces of processing. Further, the control programs that cause each of the local UI control unit 301, the remote UI control unit 302, the login service unit 303, and the IC card reader driver 304 to function as it is provide the API (Application Programming Interface) to one another. Each control program operates in cooperation with one another by using the API mutually. In explanation of the processing flow, call of the API is omitted.

Display Processing Flow of Login Screen

Figure 8:
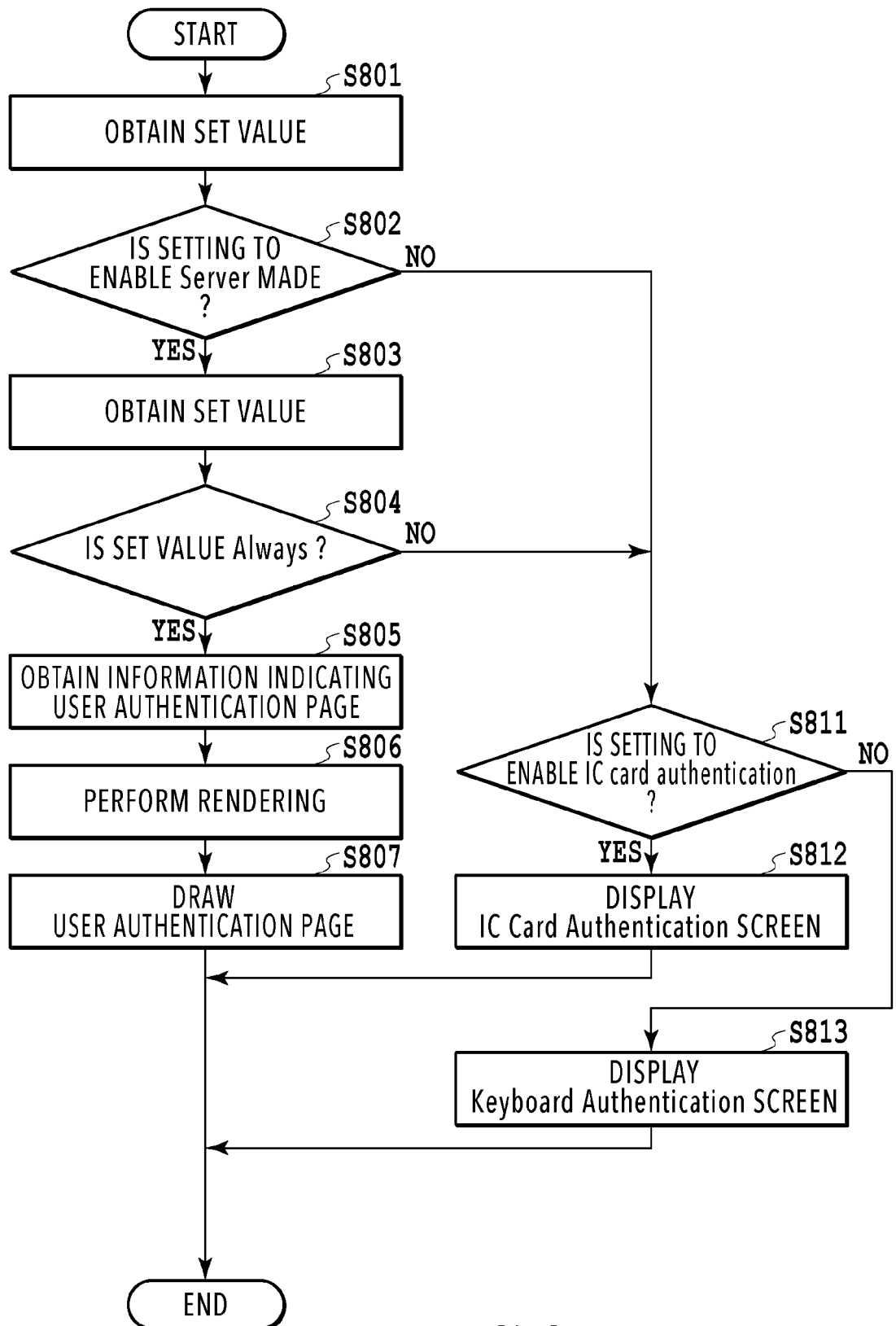
FIG. 8 is a flowchart showing an example of a processing flow of display processing of a login screen.

FIG. 8 is a flowchart showing an example of the processing flow of display processing of a login screen in the MFP 101 according to Embodiment 1. The MFP 101 starts the processing of the flowchart shown in FIG. 8 in a case where the activation of the MFP 101 is completed, in a case where the MFP 101 detects the change of the setting relating to the login function, in a case where the MFP 101 detects logout of a user and displays the login screen again, and so on. In the following explanation, a symbol "S" means a step.

First, at S801, the login service unit 303 obtains the set value of the Login Function Setting page 400 by reading it from the HDD 204. Next, at S802, the login service unit 303 determines whether or not the setting to enable "Server" is made in the setting item 402. In a case where it is determined that the setting to enable "Server" is made at S802, the MFP 101 performs the processing at S803. In this case, at S803, the login service unit 303 obtains the set value of the Server Setting page 500 corresponding to the cloud user authentication service selected in the setting item 402 by reading it from the HDD 204. After S803, at S804, the login service unit 303 determines whether or not the set value of the setting item 501 is "Always".

In a case where it is determined that the set value of the setting item 501 is "Always" at S804, the login service unit 303 obtains information indicating the user authentication page 702 for Keyboard authentication from the Web service unit 310 of the server 102 at S805. After S805, at S806, the browsing unit 305 included in the login service unit 303 performs rendering of the information obtained at S805. After S806, at S807, the browsing unit 305 draws the user authentication page 702 obtained by the rendering at S806 in the area 700. In a case where the setting to enable both "Local" and "Server" is made in the setting item 402, it may also be possible for the login service unit 303 to display a login screen as follows on the display of the operation panel 205. In this case, for example, the login service unit 303 displays a login screen including the button 703 on the display of the operation panel 205 at the time of displaying the browser UI at S807. Although not shown schematically in FIG. 8, in a case where a user presses down the button 703, for example, the MFP 101 performs processing at S811 and S812, or S811 and S813, to be described later. Due to this, the MFP 101 displays the Keyboard Authentication screen 601 or the IC Card Authentication screen 604 on the display of the operation panel 205 as the login screen.

In a case where it is determined that the setting to enable "Server" is not made at S802, or in a case where it is determined that the set value is not "Always" at S804, the MFP 101 performs the processing at S811. In this case, at S811, the login service unit 303 determines whether or not the setting to enable "IC card authentication" is set in the setting item 401. In a case where it is determined that the setting to enable "IC card authentication" is made at S811, the login service unit 303 first obtains information indicating the IC Card Authentication screen 604 from the local UI control unit 301 at S812. Next, the login service unit 303 displays the IC Card Authentication screen 604 on the display of the operation panel 205 as the login screen. In a case where it is determined that the setting to enable "IC card authentication" is not made at S811, the login service unit 303 first obtains information indicating the Keyboard Authentication screen 601 from the local UI control unit 301 at S813. Next, the login service unit 303 displays the Keyboard Authentication screen 601 on the display of the operation panel 205 as the login screen.

In a case where the setting to enable both "Keyboard authentication" and "IC card authentication" is made in the setting item 401, the login service unit 303 displays the Keyboard Authentication screen 601 including the button 602 on the display of the operation panel 205. Similarly, in this case, the login service unit 303 displays the IC Card Authentication screen 604 including the button 605 on the display of the operation panel 205.

Although not shown schematically in FIG. 8, in a case where a user presses down the button 602, the MFP 101 performs the processing at S812 and displays the IC Card Authentication screen 604 on the display of the operation panel 205. Similarly, although not shown schematically in FIG. 8, in a case where a user presses down the button 605, the MFP 101 performs the processing at S813 and displays the Keyboard Authentication screen 601 on the display of the operation panel 205. In a case where a user presses down the button 605, it may also be possible for the MFP 101 to perform processing as follows. In a case where a user presses down the button 605, for example, the MFP 101 first determines whether or not the set value of the setting item 501 is "Always". In a case where it is determined that the set value of the setting item 501 is "Always", for example, the MFP 101 performs the processing at S805 to S807 and displays the Keyboard Authentication screen 701 on the display of the operation panel 205. In a case where it is determined that the set value of the setting item 501 is not "Always", for example, the MFP 101 performs the processing at S813 and displays the Keyboard Authentication screen 601 on the display of the operation panel 205.

The user authentication page 702 that is drawn in the area 700 on the Keyboard Authentication screen 701 that is displayed on the display of the operation panel 205 as the login screen by the login service unit 303 is a web page provided by the Web service unit 310 of the server 102. Because of this, it is not possible for a user for whom only the local account shown as an example in Table 4 is set, that is, for a user whose account is not administered by the user administration unit 312 of the server 102 to log in to the MFP 101 by using the Keyboard Authentication screen 701. Such a user presses down the button 703 and displays, for example, the Keyboard Authentication screen 601 or the IC Card Authentication screen 604 in a case where the Keyboard Authentication screen 701 is displayed on the display of the operation panel 205. In a case where the Keyboard Authentication screen 601 is displayed, a user further changes "Authentication destination" on the Keyboard Authentication screen 601 to "Local" and performs the authentication operation.

Authentication Processing Flow on Keyboard Authentication Screen

Figure 9:
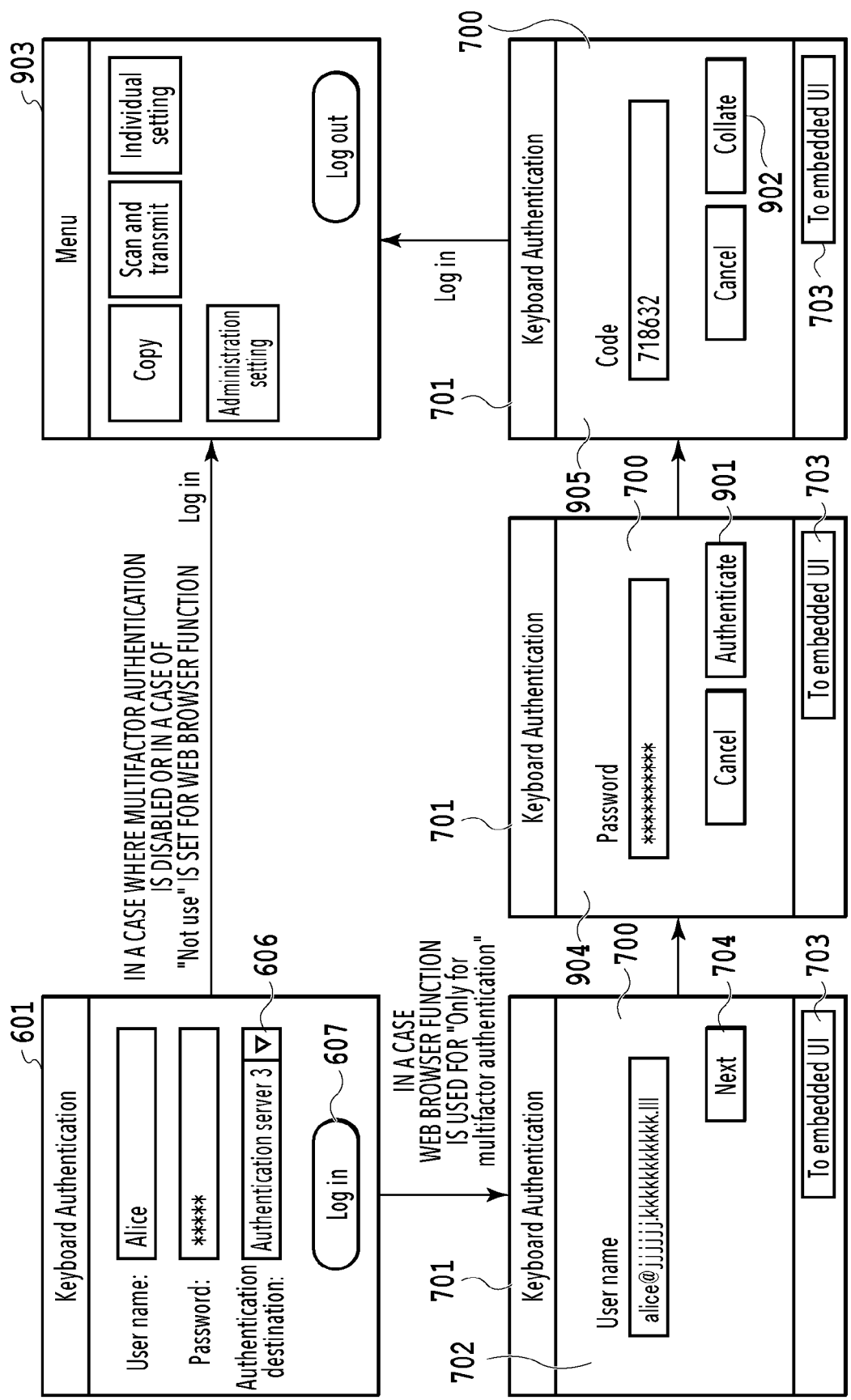
FIG. 9 is a diagram showing an example of screen transition of the login screen.
Figure 10:
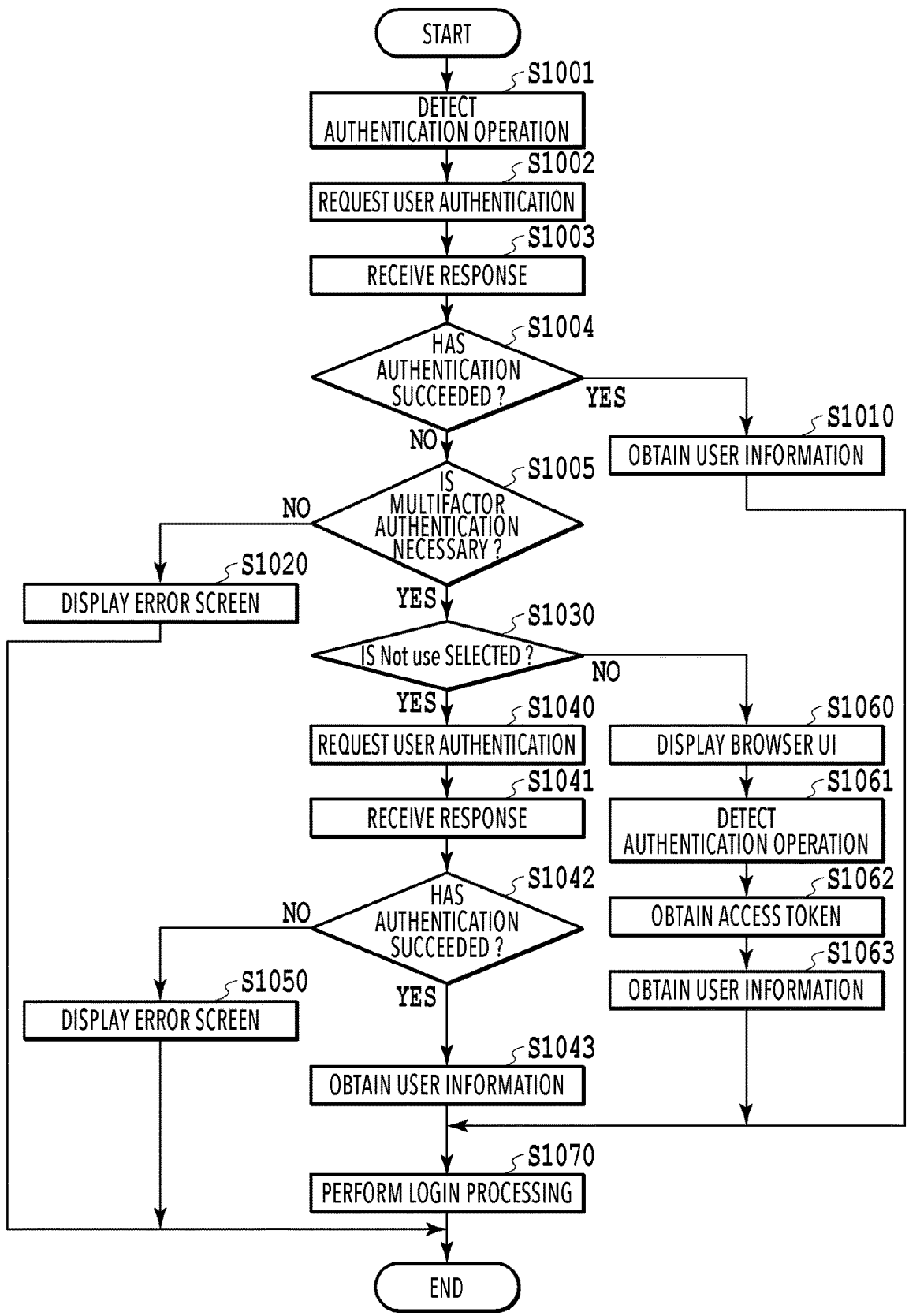
FIG. 10 is a flowchart showing an example of a processing flow of authentication processing in the MFP.

With reference to FIG. 9 and FIG. 10, the operation of the MFP 101 is explained in a case where a user logs in to the MFP 101 by using information on accounts administered by the user administration unit 312 of the server 102. FIG. 9 is a diagram showing an example of screen transition of the login screen according to Embodiment 1. FIG. 10 is a flowchart showing an example of a processing flow of authentication processing in the MFP 101 according to Embodiment 1. Specifically, the flowchart showing as an example in FIG. 10 is a processing flow in a case where user authentication is performed by using information on accounts administered by the user administration unit 312 of the server 102 in the authentication operation on the Keyboard Authentication screen 601 shown in FIG. 9. Here, the Keyboard Authentication screen 601 shown in FIG. 9 is the same as the Keyboard Authentication screen 601 shown in FIG. 6A. Explanation is given on the assumption that the MFP 101 stands by in the state where the Keyboard Authentication screen 601 is displayed on the display of the operation panel 205 as the login screen before performing the processing of the flowchart shown in FIG. 10.

First, at S1001, the login service unit 303 detects the authentication operation by a user. Specifically, the user inputs character strings representing a user name and password on the Keyboard Authentication screen 601. Further, the user presses down a button 607 in the state where a desired cloud user authentication service is selected in the area 606. By detecting that the button 607 is pressed down, the login service unit 303 detects the authentication operation by the user. Next, at S1002, the login service unit 303 makes a request for user authentication by transmitting information indicating the character string of the input user name and information indicating the character string of the input password to the server 102. At this time, the login service unit 303 complements the character string of @ and subsequent characters to the character string representing a user name as needed as described above and transmits information indicating the complemented character string along with information indicating the character string of a password. It is possible for the request for user authentication to utilize, for example, "Access Token Request" of "4.3. Resource Owner Password Credentials Grant" of "RFC6749 The OAuth 2.0 Authorization Framework". Specifically, the login service unit 303 transmits information shown as an example in Table 6 below to the URL determined in advance by the cloud user authentication service provided by the server 102 by using POST of HTTP.

TABLE 6

| Item | Value |
| --- | --- |
| grant_type | password |
| username | alice@jjjjjj.kkkkkkkkkkk.lll |
| password | ******** |
| scope | https://graph.kkkkkkkkk.lll/.default |
| client_id | nnnnnnnn-oooo-pppp-qqqq-rrrrrrrrrrrr |

Here, "scope" indicates the scope of accessible resources in a case where the access token that is obtained in a case where user authentication succeeds. The login service unit 303 designates a scope as "scope", which is necessary for obtaining the value of the user attribute (in the following, called "attribute value"), such as information indicating the mail address of the user, by using "REST API". Next, at S1003, the login service unit 303 receives a response to the request transmitted at S1002 from the server 102. Next, at S1004, the login service unit 303 determines whether or not the received response indicates that the authentication has succeeded. Specifically, the login service unit 303 determines that the authentication has succeeded in a case where the response received at S1003 includes the access token and determines that the authentication has not succeeded in a case where the received response does not include the access token.

In a case where it is determined that the authentication has succeeded at S1004, that is, in a case where the response includes the access token, at S1010, the login service unit 303 obtains detailed user information, such as information indicating the mail address of the user having succeeded in authentication. Specifically, the login service unit 303 accesses "REST API" of the cloud user authentication service provided by the server 102 by using the access token included in the response received at S1003. The login service unit 303 obtains detailed user information, such as information indicating the mail address of the user having succeeded in authentication by accessing "REST API". More specifically, the login service unit 303 stores the access token in the Authorization header of HTTP and transmits a GET request to a predetermined URL corresponding to "REST API". As a response to that, the server 102 transmits the attribute value stored in the user attribute as shown as an example in Table 2 to the MFP 101 and the MFP 101 receives this.

In a case where it is determined that the authentication has not succeeded at S1004, that is, in a case where the response does not include the access token, at S1005, the login service unit 303 determines whether or not information indicating that multifactor authentication is necessary is included in the response received at S1003. In a case where it is determined that information indicating that multifactor authentication is necessary is not included in the response at S1005, the login service unit 303 displays an error screen, not shown schematically in FIG. 9, which indicates that the authentication has failed on the display of the operation panel at S1020. Here, the error screen indicating that authentication has failed is an error screen indicating that the input user name or password is not authorized. After S1020, the MFP 101 terminates the processing of the flowchart shown in FIG. 10 and displays the Keyboard Authentication screen 601 on the display of the operation panel 205 as the login screen and strands by.

In a case where it is determined that information indicating multifactor authentication is necessary is included in the response at S1005, the MFP 101 performs the processing at S1030. In this case, at S1030, the login service unit 303 reads the set value of the setting item 501 from the HDD 204 and determines whether or not "Not use" is selected for the web browser function. In a case where it is determined that "Not use" is selected at S1030, the login service unit 303 requests the server 102 for user authentication at S1040. Specifically, the login service unit 303 requests the server 102 for client authentication by transmitting information indicating Application ID and Secret set on the Server Setting page 500 to the server 102. The request for user authentication by the request for client authentication may utilize "Access Token Request" of "4.4. Client Credentials Grant" of "RFC6749 The OAuth 2.0 Authorization Framework". More specifically, for example, the login service unit 303 transmits information as shown as an example in Table 7 below to the URL determined in advance by the cloud user authentication service provided by the server 102 using POST of HTTP.

TABLE 7

| Item | Value |
| --- | --- |
| grant_type | client_credentials |
| client_id | nnnnnnnn-oooo-pppp-qqqq-rrrrrrrrrr |
| client_secret | ******** |
| scope | https://graph.kkkkkkk.lll/.default |

After S1040, at S1401, the login service unit 303 receives a response to the request transmitted at S1040. After S1041, at S1042, the login service unit 303 determines whether or not the response received at S1041 indicates that the client authentication has succeeded. Specifically, for example, the login service unit 303 determines that the client authentication has succeeded in a case where the response received at S1041 includes the access token and determines that the client authentication has not succeeded in a case where the response does not include the access token.

In a case where it is determined that the client authentication has not succeeded at S1042, that is, in a case where the response does not include the access token, the MFP 101 performs the processing at S1050. In this case, at S1050, the login service unit 303 displays an error screen, not shown schematically in FIG. 9, which indicates that authentication has failed on the display of the operation panel. In a case where it is determined that the client authentication has not succeeded at S1042, there is a possibility that the set value of Application ID or Secret set on the Server Setting page 500 is wrong. Because of this, the login service unit 303 displays, as an error screen indicating that authentication has failed, for example, an error screen indicating there is a possibility that the set value of Application ID or Secret is wrong on the display of the operation panel 205.

In a case where it is determined that the client authentication has succeeded at S1042, that is, in a case where the response includes the access token, at S1043, the login service unit 303 obtains detailed user information, such as information indicating the mail address of the user having succeeded in authentication. Specifically, the login service unit 303 accesses "REST API" of the cloud user authentication service provided by the server 102 by using information indicating the user name and the access token included in the response obtained at S1041. The login service unit 303 obtains detailed user information, such as information indicating the mail address of the user having succeeded in authentication, by accessing "REST API". More specifically, the login service unit 303 stores the access token in the Authorization header of HTTP and transmits a GET request to a predetermined URL corresponding to "REST API". The server 102 transmits, as the response thereto, the value stored in the user attribute as shown as an example in Table 2 to the MFP 101 and the MFP 101 receives this.

As described above, in the cloud user authentication service provided by the server 102, the right capable of accessing user information is set in advance in association with Application ID. Due to this, it is possible to obtain the access token by utilizing "4.4. Client Credentials Grant" of "RFC6749 The OAuth 2.0 Authorization Framework" described above, or the like. Further, it is possible to obtain detailed user information, such as information indicting the mail address of the user by using the obtained access token. That is, according to the MFP 101 thus configured, it is possible to avoid multifactor authentication using a browser UI by multifactor authentication by client authentication.

In a case where it is determined that "Not use" is not selected at S1030, specifically, in a case where "Only for multifactor authentication" is selected in the setting item 501, the login service unit 303 performs the processing at S1060. In this case, at S1060, the login service unit 303 displays the browser UI (Keyboard Authentication screen 701) shown in FIG. 9 on the display of the operation panel 205. Here, the Keyboard Authentication screen 701 shown in FIG. 9 is the same as the Keyboard Authentication screen 701 shown in FIG. 7. The browsing unit 305 included in the login service unit 303 requests the server 102 for user authentication and access token by using the web browsing function. It is possible for the browsing unit 305 to utilize, for example, "Authorization Request" of "4.1. Authorization Code Grant" of "RFC6749 The OAuth 2.0 Authorization Framework" as the protocol of this request. Specifically, the browsing unit 305 stores parameters as shown as an example in Table 8 below and transmits a GET request of HTTP to the URL determined in advance by the cloud user authentication service provided by the server 102. As the response thereto, the server 102 transmits information indicating the user authentication page 702 configured in HTML to the MFP 101 and the MFP 101 receives this. The browsing unit 305 performs rendering of the received information indicating the user authentication page. The login service unit 303 draws the user authentication page 702 obtained by the rendering in the area 700.

TABLE 8

| Item | Value |
| --- | --- |
| response_type | code |
| client_id | nnnnnnnn-oooo-pppp-qqqq-rrrrrrrrrr |
| redirect_uri | https://localhost:443/oauth/callbak |
| scope | https://graph.kkkkkkkkk.lll/.default |

After S1060, at S1061, the login service unit 303 detects the authentication operation using WebView by a user. Specifically, the login service unit 303 detects completion of drawing of the user authentication page obtained by rendering, or the input operation by a user, or the screen transition. In the processing at S1061, first, a user inputs the character string corresponding to User name to the user authentication page 702 and presses down a "Next" button. At this time, it may also be possible to configure the login service unit 303 so that the character string corresponding to User name is automatically input to the user authentication page 702 using the information indicating the user name input on the Keyboard Authentication screen 601. Due to this, it is possible to save time and effort to input the same user name twice on the Keyboard Authentication screen 601 and the Keyboard Authentication screen 701. Further, at this time, it may also be possible to configure the login service unit 303 so that the "Next" button is pressed down automatically. For example, by using the script execution function, such as javascript in WebView, it is possible to perform the automatic input to the field and automatically perform the determination operation, such as the pressing down of the "Next" button.

In the processing at S1061, the browsing unit 305 further obtains information indicating a password input page 904. The browsing unit 305 performs rendering of the obtained information and draws the password input page 904 in the area 700. A user inputs the character string corresponding to Password to the password input page 904 and presses down an "Authenticate" button 901. At this time, it may also be possible to configure the login service unit 303 so that the character string corresponding to Password is automatically input to the password input page 904 using information indicating the password input on the Keyboard Authentication screen 601. Further, at this time, it may also be possible to configure the login service unit 303 so that the "Authenticate" button 901 is automatically pressed down. The information indicating the input user name and the information indicating the input password are transmitted to the server 102 and collated with the information on the account, which is administered by the user administration unit 312. In a case where the collation of the user name and the password in the server 102 succeeds and the setting to enable multifactor authentication is made, the server 102 makes a response by transmitting HTML requesting for user authentication of the second factor to the MFP 101.

In the processing at S1061, the MFP 101 further receives the HTML transmitted from the server 102. The browsing unit 305 performs rendering of the received HTML by WebView and draws a multifactor authentication page 905 obtained by the rendering in the area 700. In the processing at S1061, a user further performs authentication of the second factor by using one of the authentication methods using, for example, "SMS", "authentication application", and "authentication token" described above. Specifically, for example, a user refers to the one-time password obtained and displayed by the user terminal 103 and inputs the character string corresponding to the one-time password to the multifactor authentication page 905. After inputting the character string corresponding to the one-time password, the user presses down a "Collate" button 902. As described above, among the authentication methods using the authentication application 320 that runs on the user terminal 103, there is one that only approves authentication in response to an approval request from the server 102. In this authentication method, the server 102 completes the multifactor authentication by detecting that the authentication by the authentication application 320 is approved.

In a case where authorization is necessary, in the processing at S1061, the server 102 further transmits information indicating a web page seeking consent to utilization of "REST API" sometimes. Specifically, the server 102 transmits information to the MFP 101, which indicates the web page seeking consent to utilization of "REST API" designated by scope by the application corresponding to Application ID designated by client_id shown in Table 8. In the case, the MFP 101 receives the information and the browsing unit 305 may draw a web page, not shown schematically in FIG. 9, which is obtained by performing rendering of the information in the area 700.

In the following, explanation is given on the assumption that it is determined that the authentication and authorization by the multifactor authentication have succeeded in the server 102. In a case where the authentication and authorization by the multifactor authentication have succeeded, in the processing at S1061, the server 102 further transmits the access token to the URL designated by redirect_uri shown in Table 8. Specifically, the server 102 stores the access token in the URL parameter and requests WebView of the browsing unit for redirection. More specifically, for example, the server 102 requests WebView for redirection to "https://localhost:443/oauth/callback?code=access token".

At S1062, the login service unit 303 obtains the access token. Specifically, the login service unit 303 includes a Web service unit 306 and the Web service unit 306 receives the access token included in the URL parameter with the program corresponding to "https://localhost:443/oauth/callback". Due to this, the login service unit 303 obtains the access token received by the Web service unit 306. In a case where it is not possible for the login service unit 303 to obtain the access token at S1062, for example, the login service unit 303 displays an error screen, not shown schematically in FIG. 9, which indicates that the authentication or authorization has failed on the display of the operation panel. After that, the MFP 101 terminates the processing of the flowchart shown in FIG. 10 and for example, displays the Keyboard Authentication screen 601 as the login screen on the display of the operation panel 205 and stands by. It may also be possible to configure the MFP 101 so that the browsing unit 305 draws the password input page 904 in the area 700 again in a case where it is not possible for the login service unit 303 to obtain the access token at S1062.

After S1062, at S1063, the login service unit 303 obtains detailed user information, such as information indicating the mail address of the user having succeeded in authentication by using the obtained access token. Specifically, the login service unit 303 accesses "REST API" of the cloud user authentication service provided by the server 102 by using the access token obtained at S1062. The login service unit 303 obtains detailed user information, such as information indicating the mail address of the user having succeeded in authentication by accessing "REST API". More specifically, the login service unit 303 stores the access token in the Authorization header of HTTP and transmits a GET request to a predetermined URL corresponding to "REST API". As a response thereto, the server 102 transmits the value stored in the user attribute as shown as an example in Table 2 to the MFP 101 and the MFP 101 receives this.

After S1010, S1043, or S1063, at S1070, the login service unit 303 performs login processing for enabling a user to log in to the MFP 101. Specifically, for example, the login service unit 303 first instantiates a structure (in the following, called "login context") that stores information on a login user. Next, in the instantiated login context, user information obtained at S1010, S1043, or S1063 is stored. The value that is stored in the login context is, for example, User Name, Mail Address, Role and the like as shown as an example in Table 9 below.

TABLE 9

| Item | Value |
| --- | --- |
| User Name | alice@jjjjjj.kkkkkkkkkkk.lll |
| Mail Address | alice@xxxxx.yyy |
| Role | Administrator |

The attribute value of Role is determined, for example, by the login service unit 303 based on the information or the like, which indicates Job title (jobTitle) of the user information obtained from the server 102. Further, for example, it may also be possible for the login service unit 303 to determine the attribute value of Role by obtaining information (in the following, called "group information") indicating the user group to which the user having succeeded in authentication belongs and based on the obtained group information. The MFP 101 may also comprise the function for setting a correspondence relationship between user information that can be obtained from the server 102 and Role administered by the MFP 101. The login service unit 303 transmits the login context storing user information to the local UI control unit 301 via a predetermined API. The local UI control unit 301 receives this, detects that a user has logged in to the MFP 101, and causes the display of the display of the operation panel 205 to make a transition from the login screen into a Menu screen 903 shown as an example in FIG. 9.

Figure 11:
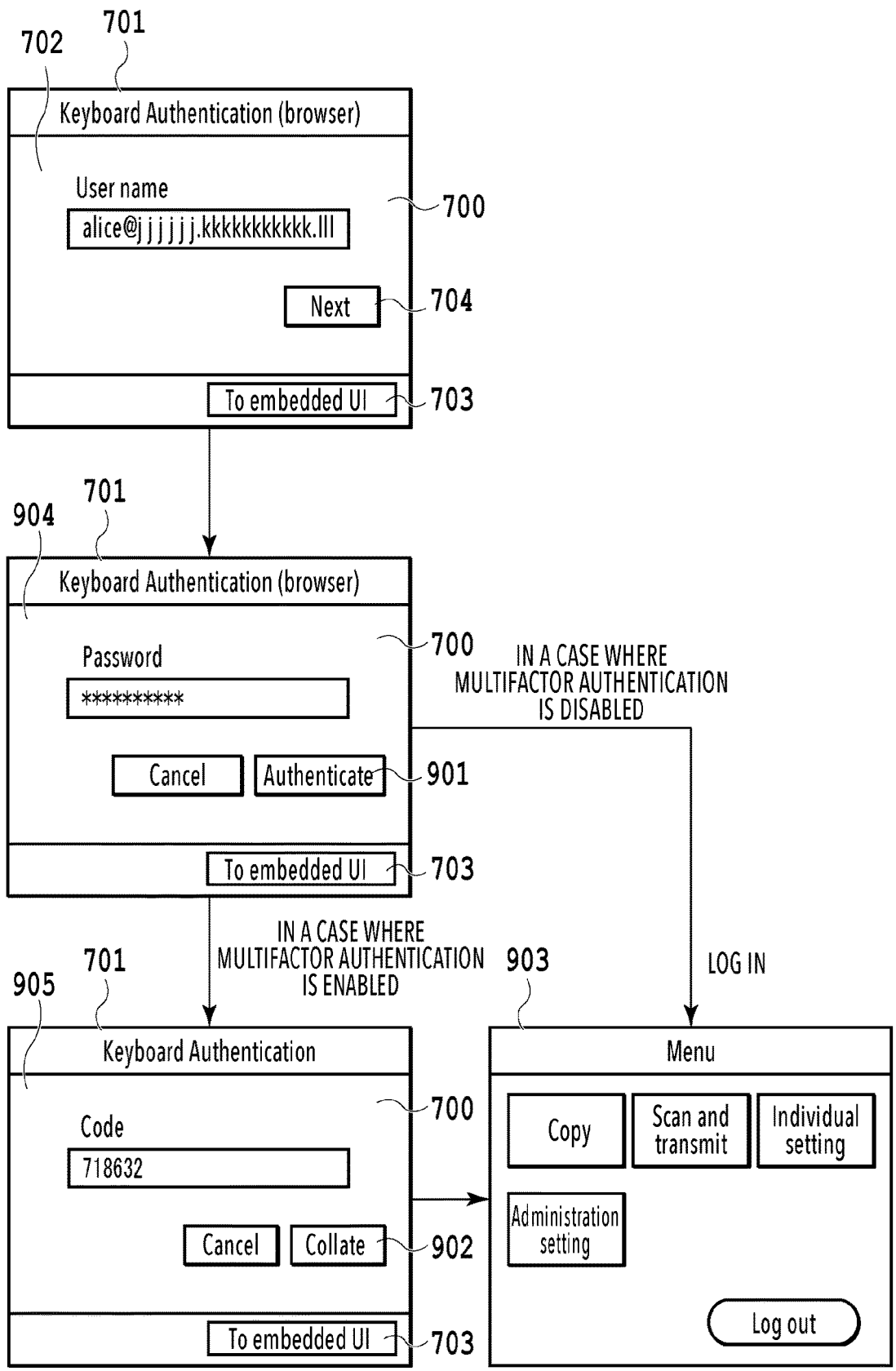
FIG. 11 is a diagram showing an example of screen transition of the login screen.

With reference to FIG. 11, screen transition of the login screen in a case where "Always" is selected in the setting item 501 is explained. FIG. 11 is a diagram showing an example of screen transition of the login screen according to Embodiment 1. Specifically, the screen transition shown as an example in FIG. 11 is the screen transition in a case where "Always" is selected in the setting item 501. The processing flow of the MFP 101 in this case is almost the same as the processing flow at S1060 to S1070 shown in FIG. 10, and therefore, detailed explanation using the flowchart is omitted. The character string corresponding to User name in the user authentication page 702 and the character string corresponding to Password in the password input page 904 are not input automatically, and therefore, it is necessary for a user to input them manually.

A user inputs the character string corresponding to User name to the user authentication page 702 drawn by WebView and presses down the "Next" button. In response to this, as described above, the MFP 101 draws the password input page 904 in the area 700. Next, the user inputs the character string corresponding to Password to the password input page 904 and presses down the "Authenticate" button. The MFP 101 transmits information on the input character strings corresponding to User name and Password and the parameter as shown as an example in Table 8 to the server 102. The server 102 collates the character strings corresponding to User name and Password with information on the account administered by the user administration unit 312.

In a case where multifactor authentication is not necessary, on a condition that the collation of the user name and password has succeeded, the server 102 transmits the access token to the URL designated by redirect_uri shown in Table 8. The MFP 101 accesses "REST API" of the cloud user authentication service provided by the server 102 by using the obtained access token and obtains detailed user information on the user having succeeded in authentication. After that, the MFP 101 performs login processing and displays the Menu screen 903.

In a case where multifactor authentication is necessary, on a condition that the collation of the user name and password has succeeded, the server 102 transmits the one-time password to the user terminal 103 as well as transmitting information indicating the multifactor authentication page 905 to the MFP 101. The MFP 101 performs rendering of this information and draws the multifactor authentication page 905 in the area 700. The user refers to the one-time password received and displayed by the user terminal 103, inputs the character string corresponding to the one-time password to the multifactor authentication page 905, and presses down the "Collate" button 902. The MFP 101 transmits information indicating the input character string corresponding to the one-time password to the server 102. The server 102 performs multifactor authentication using the one-time password and in a case where the multifactor authentication succeeds, transmits the access token to the URL designated by redirect_uri shown in Table 8. The MFP 101 accesses "REST API" of the cloud user authentication service provided by the server 102 by using the obtained access token and obtains detailed user information on the user having succeeded in authentication. After that, the MFP 101 performs login processing and displays the Menu screen 903.

Authentication Processing Flow on IC Card Authentication Screen

Figure 12:
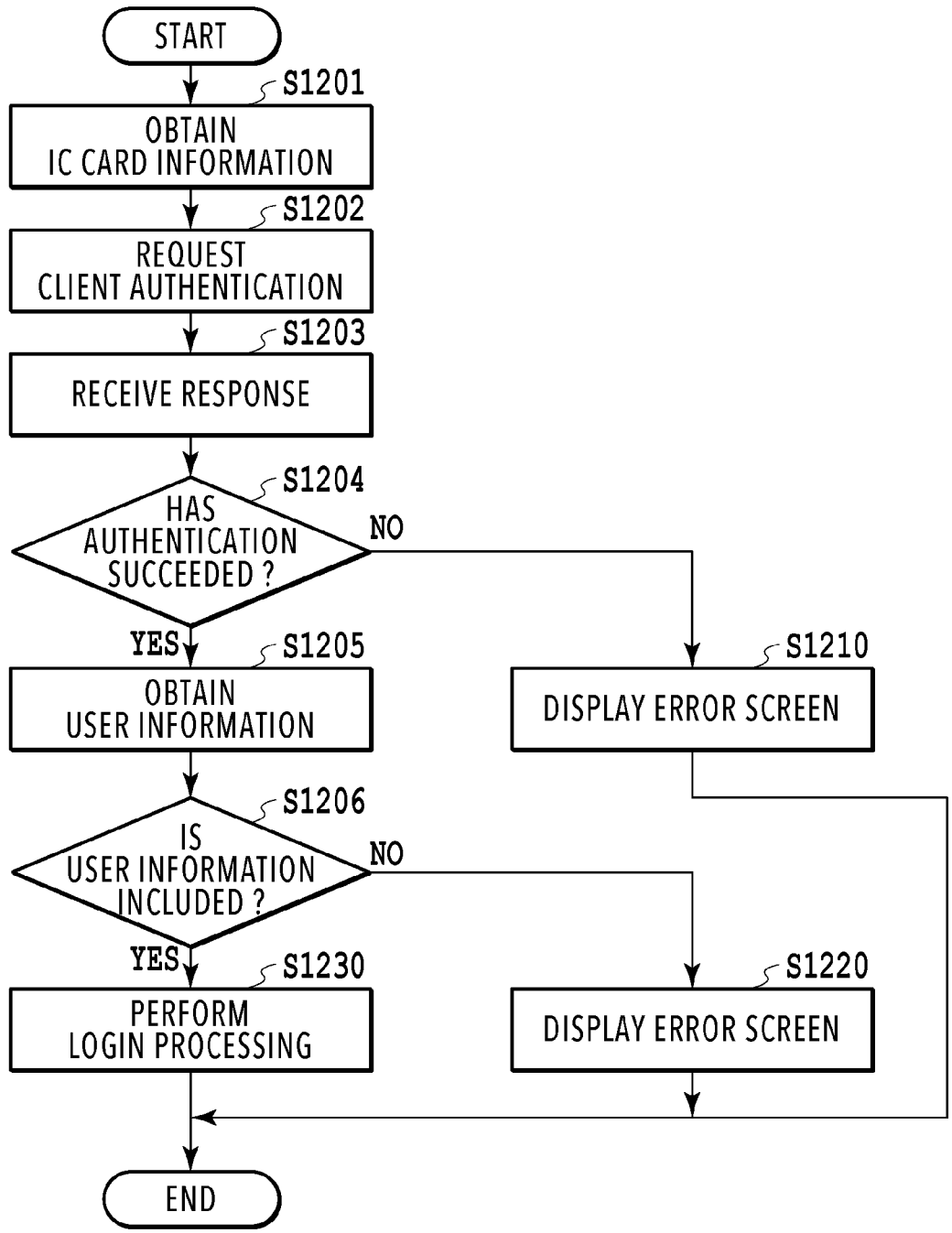
FIG. 12 is a flowchart showing an example of a processing flow of authentication processing in the MFP.

With reference to FIG. 12, the operation of the MFP 101 in a case where a user logs in to the MFP 101 by using an IC card is explained. FIG. 12 is a flowchart showing an example of a processing flow of authentication processing in the MFP 101 according to Embodiment 1. Specifically, the flowchart shown as an example in FIG. 12 is the processing flow at the time of the authentication operation on the IC Card Authentication screen 604 shown in FIG. 6B. Explanation is given on the assumption that the MFP 101 stands by in the state where the IC Card Authentication screen 604 is displayed on the display of the operation panel 205 and it is possible to detect an IC card before performing the processing of the flowchart shown in FIG. 12.

In a case where a user holds the IC card above the IC card reader 209, at S1201, the IC card reader driver 304 obtains IC card information, such as the card ID, from the IC card and notifies the login service unit 303 of this. Next, at S1202, the login service unit 303 requests the server 102 for client authentication by transmitting information indicating Application ID and Secret set on the Server Setting page 500 to the server 102. The processing at S1202 is the same as the processing at S1040 described above, and therefore, explanation is omitted. Next, at S1203, the login service unit 303 receives a response to the request transmitted at S1202. After S1203, at S1204, the login service unit 303 determines whether or not the response received at S1203 indicates that the client authentication has succeeded. Specifically, for example, in a case where the response received at S1203 includes the access token, the login service unit 303 determines that the client authentication has succeeded and in a case where the response does not include the access token, the login service unit 303 determines that the client authentication has not succeeded.

In a case where it is determined that the client authentication has not succeeded at S1204, that is, the response does not include the access token, the MFP 101 performs the processing at S1210. In this case, at S1210, the login service unit 303 displays an error screen, not shown schematically in FIG. 11, which indicates that the authentication has failed on the display of the operation panel. In a case where it is determined that the client authentication had not succeeded, there is a possibility that the set value of Application ID or Secret set on the Server Setting page 500 is wrong. Because of this, the login service unit 303 displays, as an error screen indicating that the authentication has failed, for example, an error screen indicating there is a possibility that the set value of Application ID or Secret is wrong on the display of the operation panel 205.

In a case where it is determined that the client authentication has succeeded at S1204, that is, in a case where the response includes the access token, at S1205, the login service unit 303 tries to obtain detailed user information, such as information indicating the mail address of the user having succeeded in authentication. Specifically, the login service unit 303 accesses "REST API" of the cloud user authentication service provided by the server 102 by using the access token included in the response obtained at S1203 and the IC card information obtained at S1201. More specifically, the login service unit 303 stores the access token in the Authorization header of HTTP and transmits a GET request to the predetermined URL corresponding to "REST API".

In a case where the IC card information received in the GET request is registered in the user administration unit 312, the server 102 transmits a response including the value stored in the user attribute as shown as an example in Table 2 to the MFP 101 and the MFP 101 receives this. In this case, it is possible for the login service unit 303 to obtain user information. Further, in a case where the IC card information received in the GET request is not registered in the user administration unit 312, the server 102 transmits a response not including the value stored in the user attribute as shown as an example in Table 2 to the MFP 101 and the MFP 101 receives this. In this case, it is not possible for the login service unit 303 to obtain user information.

After S1205, at S1206, the login service unit 303 determines whether or not user information is included in the response received at S1205. In a case where it is determined that user information is not included in the response at S1206, the login service unit 303 determines that user information associated with the IC card information obtained at S1201 is not registered. In this case, at S1220, the login service unit 303 displays, for example, an error screen, not shown schematically in FIG. 11, which indicates that the IC card that was held above at the time of obtaining IC card information at S1201 is an unregistered IC card, on the display of the operation unit 205.

In a case where it is determined that user information is not included in the response at S1206, it may also be possible for the login service unit 303 to collate the card ID registered in the user account table shown in Table 4 and the card ID included in the IC card information obtained at S1201. Specifically, for example, the login service unit 303 first determines whether or not the setting to enable "Local" is made in the setting item 402. In a case where it is determined that the setting to enable "Local" is not made, for example, the login service unit 303 displays a notification screen, not shown schematically in FIG. 11, which prompts a user to perform the setting to enable "Local", on the display of the operation panel 205.

In a case where it is determined that the setting to enable "Local" is made, the login service unit 303 reads the user account table shown in Table 4 from the HDD 204. Next, the login service unit 303 determines whether or not the card ID included in the IC card information obtained at S1201 is registered in the user account table. In a case where it is determined that the card ID is not registered, for example, the login service unit 303 displays an error screen indicating that the IC card information corresponding to the IC card that was held above at the time of obtaining the IC card information at S1201 is not registered on the display of the operation panel 205. In a case where it is determined that the card ID is registered, the login service unit 303 obtains user information corresponding to the IC card information obtained at S1201 from the user account table.

In a case where it is determined that user information is included in the response at S1206, the MFP 101 performs the processing at S1230. In this case, at S1230, the login service unit 303 performs login processing for enabling a user associated with the IC card information obtained at S1201 to log in to the MFP 101 by using the user information. The login processing at S1230 is the same as the login processing at S1070, and therefore, explanation is omitted. According to the MFP 101 thus configured, by registering in advance IC card information in the server 102, it is possible to perform login processing using the IC card while avoiding multifactor authentication using the browser UI.

Registration Processing Flow of IC Card Information

Figure 13:
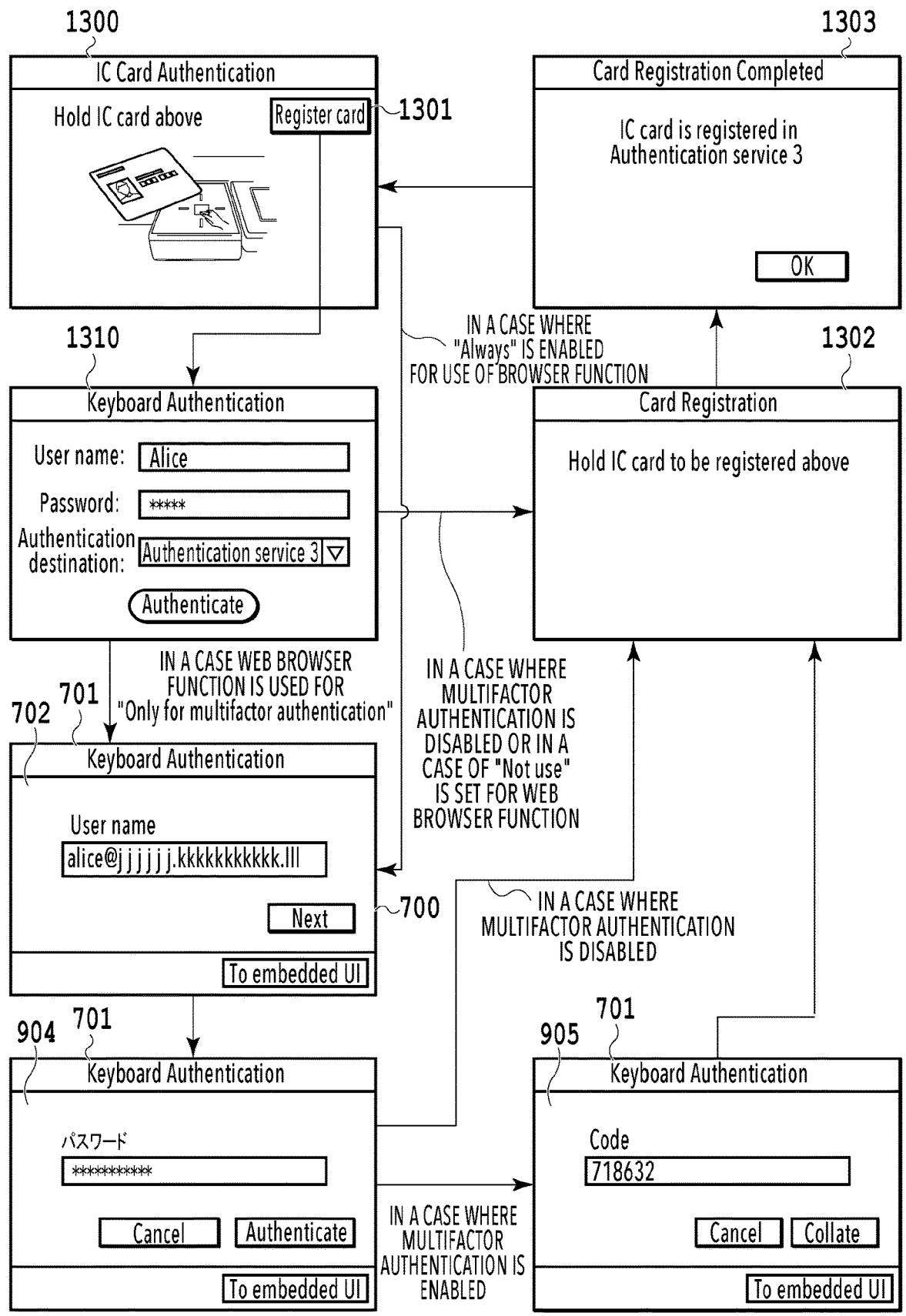
FIG. 13 is a diagram showing an example of screen transition in a case where IC card information is registered in the server.

With reference to FIG. 13, the processing flow at the time of registering IC card information in the server 102 is explained. FIG. 13 is a diagram showing an example of screen transition at the time of registering IC card information in the server 102. It may also be possible for the MFP 101 to provide a user with the function (in the following, called "IC card registration function") to register IC card information in the server 102. It is possible for the MFP 101 to register IC card information in the server 102 by applying the user authentication processing and the access token obtaining processing, both described above.

In a case where the IC card registration function is provided, an IC Card Authentication screen 1300 is displayed on the display of the operation panel 205, which includes a "Register card" button 1301 on the IC Card Authentication screen 604 shown as an example in FIG. 6B. In a case where a user presses down the Register card button, the MFP 101 authenticates the user with the user name and password and confirms that the user is a genuine user registered in the server 102. Because of this, the MFP 101 displays the Keyboard Authentication screen 601 or the Keyboard Authentication screen 701 on the display of the operation panel 205. The MFP 101 determines which of the screens is displayed by the selection state in the setting item 501. In a case where the user authentication by the authentication processing on one of the screens has succeeded and the MFP 101 has succeeded in obtaining the access token, the MFP 101 displays a Card Registration screen 1302 shown as an example in FIG. 13 on the display of the operation panel 205.

In a case where the user holds the IC card above the IC card reader 209 in the state where the Card Registration screen 1302 is displayed, the IC card reader driver 304 obtains IC card information from the IC card. The MFP 101 accesses "REST API" of the cloud user authentication service provided by the server 102 by using the obtained access token and registers the obtained IC card information in the server 102 in association with the user name corresponding to the user having succeeded in the authentication. Specifically, in a case of using the access token obtained by using "Resource Owner Password Credentials Grant", the MFP 101 registers the card ID in the server 102 as follows. First, the MFP 101 stores the access token in the Authorization header of HTTP. Next, the MFP 101 transmits a POST request including the card ID and information indicating the attribute name of the user attribute storing the card ID to the predetermined URL corresponding to "REST API". The server 102 receives the POST request and registers the card ID by storing the card ID included in the POST request in the user attribute corresponding to the attribute name. A case where the access token obtained by using "Authorization Code Grant" is used is also the same as the case of "Resource Owner Password Credentials Grant".

In a case of using the access token of the application (client) obtained by using "Client Credentials Grant", the MFP 101 first stores the access token in the Authorization header of HTTP. Next, the MFP 101 registers the card ID in the server 102 by transmitting a POST request including the card ID and information indicating the attribute name of the user attribute storing the card ID to the predetermined URL corresponding to "REST API". After receiving a response indicating the success in registration from the server 102, the MFP 101 displays a Card Registration Completed screen 1303 on the display of the operation panel 205 and notifies the user that the registration of the IC card is completed.

Effect

As described above, the information processing apparatus is configured so that it is possible to log in to the information processing apparatus, such as the MFP, which is an embedded apparatus, by using user authentication information registered in the cloud service provided by the server. Further, the information processing apparatus is configured so that even in a case where the setting to enable multifactor authentication is made in the cloud service, it is possible to log in to the information processing apparatus such as this. By configuring the information processing apparatus as described above, it is possible to provide an information processing apparatus, which is an embedded apparatus, whose affinity with the cloud service is high.

Further, the information processing apparatus is configured so as to provide the input methods of user authentication information by the browser UI using the web browser function and the input methods of user authentication information by the embedded UI excellent in operability compared to the input methods of user authentication information by the browser UI. Specifically, in the embedded UI, the function is provided, which complements @ and subsequent characters so as to facilitate the input of a user name. Due to this, with the embedded UI, it is possible to input user authentication information more easily than in the case of the browser UI. Further, the information processing apparatus is configured so that it is possible to perform user authentication by using the IC card registered in the cloud service. Due to this, it is possible for a user to log in to the information processing apparatus by using the IC card without the need to have awareness of the target for which user authentication processing is performed.

Further, the information processing apparatus is configured so that the input methods of user authentication information is changed automatically in accordance with the setting of the login function or whether or not multifactor authentication is necessary, specifically, so that the login screens switch automatically between the browser UI and the embedded UI. Due to this, for example, in a user environment (for example, tenant) in which the frequency of use of multifactor authentication is high, it is possible to perform the setting so that the browser UI is used always. Further, in a user environment in which the frequency of use of multifactor authentication is low, it is possible to perform the setting so that the embedded UI is used usually and the embedded UI is automatically switched to the browser UI for use only in a case where multifactor authentication is performed.

Further, the information processing apparatus is configured so that the character strings of the user name and password input in the embedded UI are automatically input again in the browser UI at the time of switching the embedded UI to the browser UI. Due to this, even in a case where the setting is made so that the embedded UI is used first always in a user environment in which the frequency of use of multifactor authentication is high, it is unlikely that the convenience of a user is lost considerably.

Further, in a user environment in which it is deemed that multifactor authentication may be omitted for the login to the information processing apparatus, which is an embedded apparatus, it is recommended to make the setting so that the web browser function is not used at the time of keyboard authentication, or select IC card authentication by the login method of the local UI. Due to this, multifactor authentication by client authentication is performed, and therefore, it is possible to omit multifactor authentication by the input using a keyboard.

Modification Example of Embodiment 1

In Embodiment 1, the information processing apparatus (MFP 101) comprising the web browser function is explained. Among the information processing apparatuses, which are embedded apparatuses, there is one comprising only an incompetent web browser function not capable of performing rendering of information indicating a web page configured by HTML, which is transmitted from the cloud user authentication service provided by the server 102. Further, among the information processing apparatuses, which are embedded apparatuses, there is one not comprising the web browser function due to restrictions, such as that the display of the operation panel is small. Generally, it is not possible for the information processing apparatus as described above to perform multifactor authentication. Because of this, in a case where the setting to enable multifactor authentication is made in the cloud user authentication service, it is not possible for a user to login to the information processing apparatus, and therefore, it is not possible to use the function that is provided by the information processing apparatus. On the other hand, in a case where the setting to disable multifactor authentication of the cloud user authentication service is made in order to enable a user to log in to the information processing apparatus, the resources administered by the cloud service are exposed to risk.

Consequently, in a case where the information processing apparatus does not comprise the web browser function capable of performing rendering of information indicating a web page, which is transmitted from the server 102, the information processing apparatus is configured so that the operation is the same as the operation in the state where the "Not use" is selected always in the setting item 501. Specifically, for example, the information processing apparatus is configured so that the setting item 501 is not displayed on the Server Setting page 500 in the state where "Not use" is selected in the setting item 501. It may also be possible to configure the information processing apparatus so that the selection operation from a user is not received by, for example, displaying the setting item 501 in grayout on the Server Setting page 500 in the state where "Not use" is selected in the setting item 501.

According to the information processing apparatus thus configured, it is possible to always cooperate with the cloud user authentication service provided by the server 102 without the need to use the web browser function. Further, even in a case where the setting to enable multifactor authentication is made, it is possible for a user to log in to the information processing apparatus by avoiding multifactor authentication by the input using a keyboard by multifactor authentication by client authentication. As a result, it is possible to enable a user to log in to the information processing apparatus by using user authentication information administered by the server 102 while guaranteeing safety of resources administered by the cloud service by multifactor authentication by client authentication. In a case where multifactor authentication is made strict and for example, client authentication is no longer performed, it may also be possible to configure the information processing apparatus so that it is no longer possible for a user for whom the setting to enable multifactor authentication is made to log in to the information processing apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to provide user authentication by multifactor authentication while providing user authentication by an embedded UI.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-108525, filed Jul. 5, 2022 which is hereby incorporated by reference wherein in its entirety.

What is claimed is:

1. An information processing apparatus that permits login of a user by transmitting authentication information on the user and a request regarding user authentication to a server that provides an authentication service and based on response results regarding the user authentication from the server, the information processing apparatus comprising:
   one or more hardware processors; and
   one or more memories storing one or more programs configured to be executed by the one or more hardware processors, the one or more programs including instructions for:
     performing output control by selecting a user interface based on a predetermined condition, which is one of a first user interface prepared in advance and a second user interface obtained by rendering by a browsing function, both for causing the user to input the authentication information;
     transmitting first authentication information input by using the first user interface and the request regarding the user authentication to the server;
     receiving first response results for the transmission of the first authentication information regarding the user authentication from the server;
     transmitting second authentication information input by using the second user interface and the request regarding the user authentication to the server; and
     receiving second response results for the transmission of the second authentication information regarding the user authentication from the server,
   wherein based on a setting of whether or not to use the browsing function, a user interface for which output control is performed is determined from among the first user interface and the second user interface.

2. The information processing apparatus according to claim 1, wherein
   in the state where output control is being performed for the second user interface, based on instructions to switch user interfaces by the user, the user interface for which output control is performed is switched from the second user interface to the first user interface.

3. The information processing apparatus according to claim 1, wherein
in the state where output control is being performed for the first user interface, based on the first response results, whether or not to perform output control for the second user interface is determined.

4. The information processing apparatus according to claim 3, wherein
in the state where output control is being performed for the first user interface, in a case where the first response results indicate that multifactor authentication is necessary, the user interface for which output control is performed is switched from the first user interface to the second user interface.

5. The information processing apparatus according to claim 3, wherein
the one or more programs further include an instruction for:
inputting information including the first authentication information to the second user interface as the second authentication information in a case where the first user interface is switched to the second user interface.

6. An information processing method of permitting login of a user to an information processing apparatus by transmitting authentication information on the user and a request regarding user authentication to a server that provides an authentication service and based on response results regarding the user authentication from the server, the information processing method comprising the steps of:
performing output control by selecting a user interface based on a predetermined condition, which is one of a first user interface prepared in advance and a second user interface obtained by rendering by a browsing function, both for causing the user to input the authentication information;
transmitting first authentication information input by using the first user interface and the request regarding the user authentication to the server;
receiving first response results for the transmission of the first authentication information regarding the user authentication from the server;
transmitting second authentication information input by using the second user interface and the request regarding the user authentication to the server; and
receiving second response results for the transmission of the second authentication information regarding the user authentication from the server,
wherein based on a setting of whether or not to use the browsing function, a user interface for which output control is performed is determined from among the first user interface and the second user interface.

7. A non-transitory computer readable storage medium storing a program for causing a computer to perform a control method of an information processing apparatus that permits login of a user by transmitting authentication information on the user and a request regarding user authentication to a server that provides an authentication service and based on response results regarding the user authentication from the server, the control method comprising the steps of:
performing output control by selecting a user interface based on a predetermined condition, which is one of a first user interface prepared in advance and a second user interface obtained by rendering by a browsing function, both for causing the user to input the authentication information;
transmitting first authentication information input by using the first user interface and the request regarding the user authentication to the server;
receiving first response results for the transmission of the first authentication information regarding the user authentication from the server;
transmitting second authentication information input by using the second user interface and the request regarding the user authentication to the server; and
receiving second response results for the transmission of the second authentication information regarding the user authentication from the server,
wherein based on a setting of whether or not to use the browsing function, a user interface for which output control is performed is determined from among the first user interface and the second user interface.

* * * * *